(12) United States Patent
Fukuda et al.

(10) Patent No.: US 9,567,517 B2
(45) Date of Patent: Feb. 14, 2017

(54) NEUTRON SCINTILLATOR, NEUTRON DETECTION METHOD AND NEUTRON DETECTOR

(71) Applicant: TOKUYAMA CORPORATION, Shunan-shi, Yamaguchi (JP)

(72) Inventors: Kentaro Fukuda, Shunan (JP); Noriaki Kawaguchi, Shunan (JP); Sumito Ishizu, Shunan (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 0 days.

(21) Appl. No.: 14/651,270

(22) PCT Filed: Dec. 11, 2013

(86) PCT No.: PCT/JP2013/083996
§ 371 (c)(1),
(2) Date: Jun. 11, 2015

(87) PCT Pub. No.: WO2014/092202
PCT Pub. Date: Jun. 19, 2014

(65) Prior Publication Data
US 2015/0307777 A1 Oct. 29, 2015

(30) Foreign Application Priority Data

Dec. 12, 2012 (JP) ................. 2012-271318

(51) Int. Cl.
*G01T 3/06* (2006.01)
*C09K 11/77* (2006.01)

(52) U.S. Cl.
CPC ........ *C09K 11/7734* (2013.01); *C09K 11/7721* (2013.01); *G01T 3/06* (2013.01)

(58) Field of Classification Search
CPC ..... C09K 11/7734; C09K 11/7721; G01T 3/06
See application file for complete search history.

(56) References Cited

U.S. PATENT DOCUMENTS

| 7,608,829 B2 | 10/2009 | Loureiro et al. |
| 8,044,367 B2 | 10/2011 | Yoshikawa et al. |

(Continued)

FOREIGN PATENT DOCUMENTS

| EP | 2067815 A2 | 6/2009 |
| EP | 2631676 A1 | 6/2009 |

(Continued)

OTHER PUBLICATIONS

International Preliminary Report on Patentability and Written Opinion of the International Searching Authority (Forms PCT/IB/338, PCT/IB/373 and PCT/ISA/237) for International Application No. PCT/JP2013/083996, dated Jun. 25, 2015.

(Continued)

*Primary Examiner* — Yara B Green
(74) *Attorney, Agent, or Firm* — Birch, Stewart, Kolasch & Birch, LLP

(57) ABSTRACT

A neutron scintillator composed of a resin composition comprising (A) an inorganic phosphor containing at least one neutron capture isotope selected from lithium 6 and boron 10 and (B) a resin, wherein
the inorganic phosphor is a particle having a specific surface area of 50 to 3,000 cm$^2$/cm$^3$, and the internal transmittance based on 1 cm of the optical path length of the resin composition is 30%/cm or more at the emission wavelength of the inorganic phosphor.

15 Claims, 17 Drawing Sheets

(56) References Cited

U.S. PATENT DOCUMENTS

| | | | | |
|---|---|---|---|---|
| 8,338,790 B2* | 12/2012 | Levene | ................... | G01T 1/202 |
| | | | | 250/367 |
| 2007/0007494 A1* | 1/2007 | Hirosaki | ............. | C01B 21/0602 |
| | | | | 252/301.4 R |
| 2010/0314550 A1* | 12/2010 | Yoshikawa | .......... | C09K 11/645 |
| | | | | 250/390.11 |
| 2013/0161519 A1 | 6/2013 | Ishizu et al. | | |
| 2014/0014846 A1* | 1/2014 | Kaneko | ..................... | G01T 1/20 |
| | | | | 250/369 |

FOREIGN PATENT DOCUMENTS

| | | |
|---|---|---|
| JP | 62-277587 A | 12/1987 |
| JP | 2005-200460 A | 7/2005 |
| JP | 2007-024629 A | 2/2007 |
| JP | 9-236669 A | 10/2012 |
| WO | WO 2012/060381 A1 | 5/2012 |
| WO | WO 2012/133796 A1 | 10/2012 |
| WO | WO 2012/142365 A2 | 10/2012 |

OTHER PUBLICATIONS

International Search Report issued in PCT/JP2013/083996, mailed on Mar. 18, 2014.
Extended European Search Report dated Jun. 23, 2016, for European Application No. 13862825.0.

* cited by examiner (a)            (b)

NEUTRON SCINTILLATOR, NEUTRON DETECTION METHOD AND NEUTRON DETECTOR

TECHNICAL FIELD

The present invention relates to a neutron scintillator and a neutron detector comprising the neutron scintillator. More specifically, it relates to a novel neutron scintillator which has high neutron detection efficiency and can discriminate between a neutron and a γ-ray even in a place having a large γ-ray dose which becomes background noise, a neutron detection method capable of measuring only a neutron with high accuracy and high efficiency, and a neutron detector.

BACKGROUND ART

A neutron detector is a key technology which supports neutron utilization techniques.

The neutron detector is used in the security field such as cargo inspection for the discovery of illegal nuclear-related substances; the academic research field such as structural analysis by neutron diffraction; the nondestructive inspection field; the medical field such as boron neutron capture therapy; and the resource exploration field making use of a neutron. Along with the development of neutron utilization techniques in these fields, a higher-performance neutron detector is desired.

In the neutron detector, neutron detection efficiency and discrimination ability between a neutron and a γ-ray (n/γ discrimination ability) are important.

The neutron detection efficiency is the ratio of the number of neutrons counted by a detector to the number of neutrons incident on the detector. When the neutron detection efficiency is low, the absolute number of neutrons to be measured becomes small, thereby reducing measurement accuracy. The reason that the n/γ discrimination ability is important is as follows. γ-rays are existent in the natural world as natural radiation and also produced when a neutron enters the constituent parts of a detector or a substance to be tested. Therefore, when the n/γ discrimination ability is low, a γ-ray is detected as a neutron, thereby impairing the counting accuracy of neutrons.

A known neutron detector detects a neutron based on the following mechanism.

A neutron has high penetrability without any interaction with a substance. Therefore, the neutron is generally detected by making use of a neutron capture reaction. For example, a conventionally known helium 3 detector detects a neutron by making use of a proton and tritium produced by a neutron capture reaction caused by helium 3. This helium 3 detector has high detection efficiency and excellent n/γ discrimination ability. However, since helium 3 is expensive and there is a limit to the amount of its resources, a device substituting this is awaited.

The development of a neutron detector comprising a neutron scintillator as a detector substituting the above helium 3 detector is now under way. The neutron scintillator is a substance which emits fluorescence when a neutron enters the neutron scintillator. The neutron detector can be manufactured by combining this neutron scintillator and a photodetector such as a photomultiplier tube. The performance of the neutron detector comprising a neutron scintillator depends on a substance constituting the neutron scintillator. When a neutron scintillator having a high content of an isotope which is excellent in neutron capture reaction efficiency is used, the neutron detection efficiency becomes high. Examples of the isotope which is excellent in neutron capture reaction efficiency include lithium 6 and boron 10 (U.S. Pat. No. 8,044,367).

In the neutron detector comprising a neutron scintillator, a photodetector which has detected fluorescence emitted from the neutron scintillator outputs a pulse signal so that the number of neutrons is counted based on the intensity (pulse height) of the pulse signal. A predetermined threshold value is set for a pulse height so that when the pulse height is smaller than the threshold value, the output pulse signal is treated as noise whereas when the pulse height is equal to or larger than the threshold value, the pulse signal is counted as a neutron incidence event.

Although the neutron detector comprising a neutron scintillator has an advantage that neutron detection efficiency is high, it has a problem that it is sensitive to a γ-ray and therefore has poor n/γ discrimination ability.

In the field of X-ray detectors, there is proposed a detector which comprises a powder scintillator and a resin and has small dismatch between the refractive index of the above scintillator and the refractive index of the above resin (U.S. Pat. No. 8,338,790 and U.S. Pat. No. 7,608,829). The powder scintillator used in these technologies is a fine powder which is very small in size.

DISCLOSURE OF THE INVENTION

The present invention was made to solve the above problem.

It is an object of the present invention to provide a novel technology which has high neutron detection efficiency and is capable of measuring only a neutron with high accuracy by discriminating between a neutron and a γ-ray even in a place having a large γ-ray dose which becomes background noise.

The inventors of the present invention found that, when an inorganic phosphor containing a specific neutron capture isotope is used as a fine particle having a specific surface area within a specific range, a high-speed electron produced upon the incidence of a γ-ray on the inorganic phosphor particle easily deviates from the inorganic phosphor particle before it provides energy, thereby obtaining a neutron scintillator which minimizes the emission of fluorescence caused by the incidence of the γ-ray. The present invention was accomplished based on this finding.

According to the present invention, firstly, the above object and advantage of the present invention are attained by a neutron scintillator which is composed of a resin composition comprising (A) an inorganic phosphor containing at least one neutron capture isotope selected from lithium 6 and boron 10, and (B) a resin, wherein
the inorganic phosphor is a particle having a specific surface area of 50 to 3,000 $cm^2/cm^3$, and the internal transmittance based on 1 cm of the optical path length of the resin composition is 30%/cm or more at the emission wavelength of the inorganic phosphor.

This neutron scintillator may further comprise (C) a phosphor containing no neutron capture isotope.

Secondly, the above object and advantage of the present invention are attained by a neutron detector comprising:
the above neutron scintillator;
a photodetector; and
discrimination means for discriminating between a signal produced by a neutron and a signal produced by a γ-ray.

Thirdly, the above object and advantage of the present invention are attained by a neutron detection method making use of the above neutron scintillator.

BEST MODE FOR CARRYING OUT THE INVENTION

<Neutron Scintillator>

Figure 1:
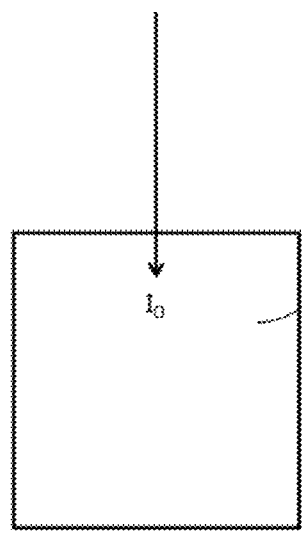
FIGS. 1(a) and 1(b) are schematic diagrams showing a method of measuring internal transmittance in Examples.
Figure 1:
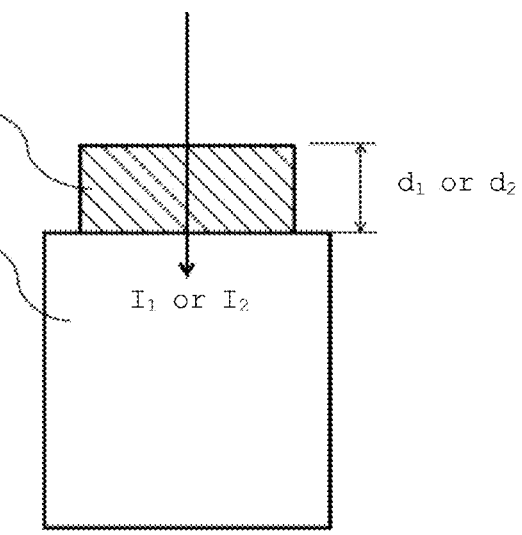

The neutron scintillator of the present invention comprises (A) an inorganic phosphor containing at least one neutron capture isotope selected from lithium 6 and boron 10 and (B) a resin. This neutron scintillator may further comprise (C) a phosphor containing no neutron capture isotope.

A description is subsequently given of each component contained in the neutron scintillator of the present invention.

[(A) Inorganic Phosphor]

The inorganic phosphor (A) in the present invention contains at least one neutron capture isotope selected from lithium 6 and boron 10.

When the inorganic phosphor (A) is irradiated with a neutron, a neutron capture reaction occurs to produce a secondary particle by which the inorganic phosphor is provided with energy to be excited, thereby emitting fluorescence. The type of the secondary particle and energy provided to the inorganic phosphor by the secondary particle are as follows according to the type of the neutron capture isotope.

Lithium 6; α-ray and tritium, 4.8 MeV
Boron 10; α-ray and lithium 7, 2.3 MeV

Lithium 6 and boron 10 have high neutron capture reaction efficiency, and energy provided to the inorganic phosphor through the neutron capture reaction by Lithium 6 and boron 10 is high. Therefore, the neutron scintillator of the present invention comprising an inorganic phosphor containing at least one neutron capture isotope selected from these is excellent in neutron detection efficiency and the intensity of fluorescence emitted when a neutron is detected, respectively.

As for the content of the neutron capture isotope in the inorganic phosphor (A), the content of lithium 6 is preferably 1 atom/$nm^3$ or more, more preferably 6 atoms/$nm^3$ or more; and the content of boron 10 is preferably 0.3 atom/$nm^3$ or more, more preferably 2 atoms/$nm^3$ or more. The term "the content of the neutron capture isotope" means the number of neutron capture isotopes contained in 1 $nm^3$ of the inorganic phosphor. By setting this content to the above range, the probability that the incident neutron causes a neutron capture reaction becomes high, thereby improving neutron detection efficiency.

The content of the neutron capture isotope in the inorganic phosphor (A) can be suitably set by selecting the chemical composition of the inorganic phosphor in use and adjusting the isotope ratio of the neutron capture isotope in the raw material (such as LiF or $B_2O_3$) of the inorganic phosphor. The term "isotope ratio" means the ratio of the number of lithium 6 atoms to the total number of all lithium atoms or the ratio of the number of boron 10 atoms to the total number of boron atoms. This value can be obtained from the following numerical formula (1) or (2) according to whether the neutron capture isotope is lithium 6 or boron 10.

$$\text{Content of lithium } 6 = \rho \times W_{Li} \times C_{Li}/(700 - C_{Li}) \times A \times 10^{-23} \qquad (1)$$

$$\text{Content of boron } 10 = \rho \times W_B \times C_B/(1100 - C_B) \times A \times 10^{-23} \qquad (2)$$

(In the above formulas (1) and (2), $\rho$ is the density [g/$cm^3$] of the inorganic phosphor; $W_{Li}$ and $W_B$ are the mass fractions [mass %] of lithium and boron in the inorganic phosphor, respectively; $C_{Li}$ and $C_B$ are the isotope ratios [%] of lithium 6 and boron 10 in the raw material, respectively; and A is an Avogadro number [$6.02 \times 10^{23}$].)

Examples of the method of adjusting the isotope ratio of the neutron capture isotope in the raw material include one in which a neutron capture isotope is concentrated to a intended ratio and one in which a concentrated raw material containing a neutron capture isotope concentrated over a intended isotope ratio is prepared and mixed with a natural raw material. As for the isotope ratio in nature, the isotope ratio of lithium 6 is about 7.6% and the isotope ratio of boron 10 is about 19.9%.

The upper limit of the content of the neutron capture isotope in the inorganic phosphor (A) is not particularly limited but preferably 60 atoms/$nm^3$ or less. To achieve a neutron capture isotope content of more than 60 atoms/$nm^3$, a large amount of a special raw material containing a highly concentrated neutron capture isotope must be used. Therefore, the production cost becomes extremely high and the selection of the type of an inorganic phosphor in use is markedly limited.

The wavelength of fluorescence emitted after the inorganic phosphor (A) captures a neutron is preferably in a near-ultraviolet to visible light region, particularly preferably in a visible light region. Fluorescence of a near-ultraviolet to visible light region is preferred because its transmittance is high in a neutron scintillator obtained by mixing the particulate inorganic phosphor (A) with the resin (B) which will be described hereinafter.

The neutron capture isotope in the inorganic phosphor (A) is preferably only lithium 6 or only boron 10, particularly preferably only lithium 6. When the neutron capture isotope is only lithium 6 and a neutron capture reaction occurs, a constant strong energy of 4.8 MeV is provided to the inorganic phosphor. Therefore, a neutron scintillator which has little variations in fluorescence intensity for each neutron capture reaction and high fluorescence intensity can be obtained.

As the inorganic phosphor (A) in the present invention, an inorganic phosphor composed of a crystal or an inorganic phosphor composed of glass may be used. Examples of these inorganic phosphors include inorganic phosphors composed of a crystal such as Eu:LiCaAlF$_6$, Eu,Na:LiCaAlF$_6$, Eu:LiSrAlF$_6$, Ce:LiCaAlF$_6$, Ce,Na:LiCaAlF$_6$, Ce:LiSrAlF$_6$, Eu:LiI, Ce:Li$_6$Gd(BO$_3$)$_3$, Ce:LiCs$_2$YCl$_6$, Ce:LiCs$_2$YBr$_6$, Ce:LiCs$_2$LaCl$_6$, Ce:LiCs$_2$LaBr$_6$, Ce:LiCs$_2$CeCl$_6$ and Ce:LiRb$_2$LaBr$_6$; and inorganic phosphors composed of glass such as Li$_2$O—MgO—Al$_2$O$_3$—SiO$_2$—Ce$_2$O$_3$.

The inorganic phosphor which can be advantageously used in the present invention is a colquirite type crystal represented by the following chemical formula and doped with at least one lanthanoid atom, or the above colquirite type crystal doped with at least one alkali metal atom in addition to the lanthanoid atom.

$$LiM^1M^2X_6$$

(M$^1$ is at least one alkali earth metal atom selected from Mg, Ca, Sr and Ba; M$^2$ is at least one metal atom selected from Al, Ga and Sc; and X is at least one halogen atom selected from F, Cl, Br and I.)

The doping amount of the lanthanoid atom is preferably 0.005 to 5 mol %, more preferably 0.01 to 3 mol %, much more preferably 0.01 to 0.5 mol % based on 1 mol of LiM$^1$M$^2$X$_6$; and the doping amount of the alkali metal atom is preferably 5 mol % or less, more preferably 0.005 to 3 mol %, much more preferably 0.01 to 0.5 mol % based on 1 mol of LiM$^1$M$^2$X$_6$.

Examples of the above inorganic phosphor composed of a colquirite type crystal include Eu:LiCaAlF$_6$, Eu,Na:LiCaAlF$_6$, Eu:LiSrAlF$_6$, and Eu,Na:LiSrAlF$_6$. Use of at least one selected from these as the inorganic phosphor (A) is particularly preferred because it has high emission intensity, nonhygroscopicity and chemical stability. The production process of the inorganic phosphor composed of a colquiriite type crystal is disclosed by, for example, U.S. Pat. No. 8,044,367 which is listed above.

The inorganic phosphor (A) contained in the neutron scintillator of the present invention is used in the form of a particle having a specific surface area of 50 to 3,000 cm$^2$/cm$^3$. Thereby, the n/γ discrimination ability of the obtained neutron scintillator is significantly improved. This function mechanism is considered as follows.

When a neutron enters the neutron scintillator, the neutron capture isotope contained in the inorganic phosphor in the neutron scintillator causes a neutron capture reaction to release a secondary particle and energy. This energy excites the inorganic phosphor to emit fluorescence therefrom, thereby making it possible to count the incidence of the neutron by detecting this fluorescence.

However, the detection mechanism of the neutron is disturbed by a γ-ray. When a γ-ray enters the inorganic phosphor, a high-speed electron is produced in the inorganic phosphor. When this high-speed electron provides energy to the inorganic phosphor, the inorganic phosphor emits fluorescence. When the pulse height of fluorescence caused by the incidence of the γ-ray competes with the pulse height of fluorescence caused by the incidence of the neutron and these cannot be discriminated from each other, fluorescence caused by the γ-ray is counted as one caused by the incidence of the neutron, whereby an error occurs in the count number of neutrons.

Since γ-rays exist in the natural world, the above error always exists as a problem and an error in the count number of neutrons expands in a place having a large γ-ray dose, resulting in a significant problem.

Then, the inventors of the present invention paid attention to the fact that the pulse height of fluorescence caused by the incidence of a γ-ray depends on the magnitude of energy provided by the high-speed electron. That is, the pulse height of fluorescence caused by the incidence of a γ-ray can be reduced by setting an environment where energy provided to the inorganic phosphor by the above high-speed electron becomes low.

To realize this, in the present invention, the inorganic phosphor (A) is used in the form of a fine particle. Since the inorganic phosphor (A) in the present invention is a fine particle having a small size, a high-speed electron produced by the incidence on the inorganic phosphor of a γ-ray deviates from the inorganic phosphor particle before it provides all of its energy to the inorganic phosphor particle. Then, as energy provided to the inorganic phosphor (A) in the present invention by the high-speed electron is limited to a small value, the pulse height of fluorescence caused by the incidence of the γ-ray becomes small. Therefore, when the emission of fluorescence from the neutron scintillator of the present invention is observed, it is possible to judge whether the emission is caused by the incidence of a neutron or by the incidence of a γ-ray based on the amplitude of the pulse height by checking the pulse height of the emission.

The size of the inorganic phosphor particle (A) in the present invention is not particularly limited as long as it is the size that enables the high-speed electron produced by the incidence of a γ-ray to deviate from the inorganic phosphor before it provides all of its energy. It is considered that the high-speed electron deviates from the inorganic phosphor particle more quickly as the size of the inorganic phosphor particle becomes smaller. However, the inorganic phosphor particle is various in shape (for example, plate-like, prismatic, cylindrical, spherical, etc.) according to the type and production process thereof. The deviation ease of the high-speed electron depends on the particle form of the inorganic phosphor in addition to the size. Therefore, it is difficult to univocally determine the size that ensures the quick deviation from the inorganic phosphor particle of the high-speed electron.

However, studies conducted by the inventors of the present invention revealed that the deviation ease of the high-speed electron is correlated with the specific surface area per unit volume (cm$^2$/cm$^3$) of the inorganic phosphor particle. This value is obtained by multiplying the BET specific surface area of each particle by the density of the particles. The inorganic phosphor (A) in the present invention has a specific surface area of preferably 50 cm$^2$/cm$^3$ or more, particularly preferably 100 cm$^2$/cm$^3$ or more.

Since the specific surface area of the inorganic phosphor (A) in the present invention is a specific surface area per unit volume, (1) this specific surface area becomes larger as the volume of the inorganic phosphor particle becomes smaller, and (2) if the inorganic phosphor has the same volume, when it is spherical, its specific surface area becomes the smallest, and as the specific surface area becomes larger, the particle becomes less spherical.

For example, presuming that the inorganic phosphor particle is a rectangular parallelepiped particle having sides extending in X-axis, Y-axis and Z-axis directions, when it is a regular hexahedron (cube) which satisfies X=Y=Z, its surface area becomes the smallest; and when either one of the sides is made long and the others are made short, the surface area becomes large with the same volume. Stated more specifically, since a regular hexahedron having X, Y and Z side lengths of 0.1 cm, it has a volume of 0.001 $cm^3$ and a surface area of 0.06 $cm^2$ and accordingly, its specific surface area per unit volume is 60 $cm^2/cm^3$; and when it is a rectangular parallelepiped particle having X, Y and Z side lengths of 0.025 cm, 0.2 cm and 0.2 cm, it has the same volume of 0.001 $cm^3$ but its surface area is 0.1 $cm^2$, and accordingly its specific surface area per unit volume is 100 $cm^2/cm^3$.

That is, the particle having a large specific surface area per unit volume in the present invention is a particle having an extremely small length in at least one axial direction. Since a high-speed electron which is excited by a γ-ray travelling in the axial direction where the length is extremely small or a direction close to the above axial direction deviates quickly in that axial direction, the amount of energy provided to the inorganic phosphor particle from the high-speed electron is reduced. Therefore, if there is at least one axial direction where the length is extremely small, the lengths in the other axial directions may be large. That the specific surface area of the inorganic phosphor (A) in the present invention is 50 $cm^2/cm^3$ or more is the requirement for securing this.

The specific surface area of the inorganic phosphor (A) in the present invention is 3,000 $cm^2/cm^3$ or less. When a particle has a specific surface area of more than 3,000 $cm^2/cm^3$, the size of the particle is extremely small. In this case, a secondary particle produced by a neutron capture reaction may deviate from the inorganic phosphor particle before it provides all of its energy to the inorganic phosphor particle. If this happens, the emission intensity of fluorescence caused by the incidence of a neutron becomes low disadvantageously. Therefore, the specific surface area of the inorganic phosphor (A) is limited to 3,000 $cm^2/cm^3$ or less, preferably 1,500 $cm^2/cm^3$ or less.

In the above explanation, the term "axis" is used but this term is used for convenience sake to indicate the space coordinate position of X, Y or Z. The inorganic phosphor particle (A) in the present invention is not limited to a cube having sides in these specific axial directions. The shape of the inorganic phosphor particle (A) in the present invention may be plate-like, prismatic, cylindrical, spherical, or indefinite.

The specific surface area equivalent spherical diameter of the inorganic phosphor particle (A) in the present invention is preferably 20 to 1,200 μm, more preferably 40 to 600 μm. The specific surface area in consideration of the above specific surface area equivalent spherical diameter is a specific surface area per unit volume.

The production process of the inorganic phosphor particle (A) in the present invention is not particularly limited. Examples of the process include one in which an inorganic phosphor bulk body larger than a desired size is prepared, ground and classified and one in which a particle having a desired size is directly obtained through a particle production reaction using an inorganic phosphor solution or a solution of its precursor as a starting material. Out of these, the method in which the bulk body is ground and classified is preferred because it has high production efficiency and a desired inorganic phosphor particle is obtained at a low cost.

As the grinding method may be used a method using a known grinder mill such as a hammer mill, roller mill, rotary mill, ball mill or bead mill. Out of these, a hammer mill or roller mill is particularly preferably used since a particle having a desired shape and a desired size can be easily obtained while the production of fine particles having an extremely large specific surface area is suppressed.

As the method of classification which is carried out after the above grinding, a known method such as dry sieving, wet sieving or pneumatic classification may be employed without restriction. When particles are classified by sieving, they are let pass through an upper sieve having an opening size of 200 to 1,000 μm and particles remaining on a lower sieve having an opening size of 20 to 100 μm are collected to be used. This method is preferred because particles having the above specific surface area are easily collected.

[(B) Resin]

The neutron scintillator of the present invention is characterized in that it is composed of a resin composition comprising (A) the above inorganic phosphor and (B) a resin. As understood from the above explanation of the inorganic phosphor (A), the inorganic phosphor (A) used in the present invention is a fine particle having an extremely small size as compared with an inorganic phosphor used in a conventionally known neutron scintillator. Therefore, when one inorganic phosphor particle (A) is used alone, neutron detection efficiency becomes poor. To solve this problem, in the present invention, a large number of inorganic phosphor particles (A) are used at the same time and dispersed in a resin before use. Owing to this constitution, a neutron scintillator having excellent n/γ discrimination ability and high neutron detection efficiency can be obtained.

In the neutron detector which will be described hereinafter, in order to guide fluorescence emitted by the inorganic phosphor (A) contained in the resin composition to a photodetector efficiently, the resin composition is preferably transparent. Studies conducted by the inventors of the present invention revealed that fluorescence emitted by the inorganic phosphor can be guided to a photodetector efficiently by setting the internal transmittance based on 1 cm of the optical path length of the resin composition to 30%/cm or more at the emission wavelength of the inorganic phosphor. When the resin composition has such transparency, the pulse height of a signal output from the photodetector can be made large and variations in the pulse height become small, whereby the signal/noise ratio of the neutron detector becomes high and also it is easy to discriminate between a signal produced by a neutron and a signal produced by a γ-ray. The internal transmittance based on 1 cm of the optical path length of the resin composition is preferably 50%/cm or more at the emission wavelength of the inorganic phosphor (A). The internal transmittance of the resin composition at a wavelength range other than the emission wavelength of the inorganic phosphor (A) may be low.

The term "internal transmittance" in the present invention means a transmittance from which a surface reflection loss occurring on the incoming side and outgoing side surfaces of the resin composition has been removed when light is transmitted through the resin composition and represented by a value based on 1 cm of the optical path length. This internal transmittance ($\tau_{10}$) is a value obtained by measuring the transmittances including a surface reflection loss of a pair of samples which differ in thickness and are formed from the above resin composition and substituting these transmittances in the following formula (3).

$$\log(\tau_{10})=\{\log(T_2)-\log(T_1)\}/(d_2-d_1) \quad (3)$$

(In the above formula (3), $d_1$ and $d_2$ are the thicknesses (cm) of the pair of resin composition samples which differ in thickness, with the proviso that $d_2>d_1$; and $T_1$ and $T_2$ are transmittances including a surface reflection loss of the resin composition samples having thicknesses $d_1$ and $d_2$, respectively.)

To increase the internal transmittance of the resin composition, a resin which is transparent at the emission wavelength of the inorganic phosphor (A) is preferably used as the resin (B) in the present invention. Stated more specifically, a resin having an internal transmittance of 80%/cm or more at the emission wavelength of the inorganic phosphor (A) is preferably used, and a resin having an internal transmittance of 90%/cm or more is particularly preferably used. The internal transmittance of a resin can be obtained in the same manner as the resin composition which has been explained above except that a sample composed of a resin alone is used.

The resin (B) preferably has a refractive index at the emission wavelength of the inorganic phosphor (A) close to the refractive index of the inorganic phosphor itself at the above wavelength. Stated more specifically, the ratio of the refractive index of the resin (B) to the refractive index of the inorganic phosphor (A) at the emission wavelength of the inorganic phosphor (A) is preferably 0.95 to 1.05, particularly preferably 0.98 to 1.02. By setting the ratio of these refractive indices to this range, the scattering of light at the interface between the inorganic phosphor (A) and the resin (B) can be suppressed, thereby making it possible to increase the internal transmittance of the resin composition. The term "refractive index" as used herein means a refractive index at a temperature at which the neutron scintillator and the neutron detector of the present invention are used. Therefore, when the neutron scintillator and the neutron detector of the present invention are used at a temperature around 100° C., the above refractive index must be measured at around 100° C.

The above refractive index can be measured by using a commercially available refractometer. The light source for measuring the refractive index may be selected from d-line (587.6 nm) and r-line (706.5 nm) of a He lamp, F-line (486.1 nm) and C-line (656.3 nm) of a $H_2$ lamp, and i-line (365.0 nm), h-line (404.7 nm), g-line (435.8 nm) and e-line (546.1 nm) of a Hg lamp. Two light sources on a shorter wavelength side and a longer wavelength side than the emission wavelength of the inorganic phosphor (A) are suitably selected from these light sources and used to measure refractive indices at the wavelengths of the light sources. After constants A and B are obtained by substituting the wavelengths of the two light sources and refractive indices measured at these wavelengths in the following Sellmeier formula (formula (4)), the constants A and B and the emission wavelength of the inorganic phosphor (A) are substituted in the formula to obtain the refractive index at the emission wavelength of the inorganic phosphor (A).

$$n^2-1=A\lambda^2/(\lambda^2-B) \quad (4)$$

(In the formula (4), n is a refractive index at a wavelength $\lambda$, and A and B are constants.)

When the emission wavelength of the inorganic phosphor (A) is the same as the wavelength of any one of the above light sources, the refractive index may be directly obtained by using the light source.

It is convenient to use bulk bodies having a shape suitable for the measurement of the refractive index as samples of the inorganic phosphor (A) and the resin (B).

The resin (B) in the present invention is preferably a resin having the above characteristic properties. Examples of the resin include silicone resin, fluororesin, poly(meth)acrylate, polycarbonate, polystyrene, polyvinyl toluene and polyvinyl alcohols. At least one selected from these may be used. It is also preferred that a mixture of several different resins should be used to adjust the refractive index.

As the resin (B) in the present invention, a resin which is solid at a temperature range from room temperature to the use temperature range of the neutron detector is preferred, and a thermosetting resin (thermally crosslinkable resin) is particularly preferred from the viewpoints of handling ease and stability as a resin.

[Mixing Ratio of Inorganic Phosphor (A) and Resin (B)]

Although the mixing ratio of the inorganic phosphor (A) and the resin (B) in the resin composition constituting the neutron scintillator of the present invention is not particularly limited, the volume fraction of the inorganic phosphor (A) in the resin composition is preferably 5% or more, more preferably 10% or more, particularly preferably 20% or more. By setting the volume fraction of the inorganic phosphor (A) in the resin composition to this range, the neutron detection efficiency per unit volume of the resin composition can be enhanced.

Meanwhile, the volume fraction of the inorganic phosphor (A) in the resin composition is preferably 65% or less, more preferably 50% or less, particularly preferably 40% or less. When the volume fraction of the inorganic phosphor (A) is higher than 65%, the inorganic phosphor particles (A) are extremely densely filled in the resin composition. Therefore, it is possible that a high-speed electron produced by the incidence of a γ-ray reaches and provides energy to other adjacent inorganic phosphor particles it deviates from the original inorganic phosphor particle. In this case, since the total of energy provided to these adjacent inorganic phosphor particles is large, the pulse height of a signal produced by a γ-ray becomes large, thereby impairing n/γ discrimination ability disadvantageously.

[(C) Phosphor Containing No Neutron Capture Isotope]

The neutron scintillator of the present invention may further comprise (C) a phosphor containing no neutron capture isotope (may also be referred to as "neutron insensitive phosphor" hereinafter) besides the inorganic phosphor (A) and the resin (B).

When the neutron scintillator of the present invention comprises the neutron insensitive phosphor (C), a high-speed electron produced by the incidence of a λ-ray reaches the neutron insensitive phosphor (C) to provide energy after it deviates from the inorganic phosphor (A). The neutron insensitive phosphor (C) which has received this energy emits fluorescence. That is, when a γ-ray is incident, both the inorganic phosphor particle (A) and the neutron insensitive phosphor (C) are provided with energy to emit fluorescence.

Meanwhile, when a neutron is incident, as a secondary particle produced in the inorganic phosphor (A) does not deviate from the inorganic phosphor particle, only the inorganic phosphor (A) emits fluorescence.

When the neutron insensitive phosphor (C) which emits fluorescence different in fluorescence life or emission wavelength from fluorescence emitted from the inorganic phosphor (A) is used, it is possible to discriminate between the incidence of a neutron and the incidence of a λ-ray by checking the emission characteristics of fluorescence. The lifetime and emission wavelength of fluorescence differ according to the type of a luminous body, and examples thereof are given below.

A 0.04 mol %-Eu:LiCaAlF$_6$ crystal which is a preferred example of the inorganic phosphor (A) has a fluorescence lifetime approximately in the order of several μsec as a decay time constant value and an emission wavelength of 370 nm, 2,5-diphenyloxazole which is a preferred example of the neutron insensitive phosphor (C) has a fluorescence lifetime approximately in the order of several nsec as a decay time constant value, and 1,4-bis(5-phenyl-2-oxazolyl) benzene which is another preferred example of the neutron insensitive phosphor (C) has an emission wavelength of 420 nm.

Therefore, when the observed emission is only long-life fluorescence, it can be discriminated as emission caused by a neutron whereas when the observed emission is a synthetic wave of long-life emission and short-life emission, it can be discriminated as emission caused by a γ-ray; or it is possible to discriminate between emission caused by a neutron and emission caused by a γ-ray by checking the wavelength of the observed emission. A more specific discrimination method will be described hereinafter.

In the neutron scintillator of the present invention, the neutron insensitive phosphor (C) is preferably existent in a state that it is dissolved in the resin (B).

Examples of the neutron insensitive phosphor (C) include organic phosphors such as 2,5-diphenyloxazole, 1,4-bis(5-phenyl-2-oxazolyl)benzene, 1,4-bis(2-methylstyryl)benzene, anthracene, stilbene, naphthalene and derivatives thereof. Since these organic phosphors have a significantly short fluorescence lifetime as compared with the inorganic phosphor (A), they can be advantageously used for n/γ discrimination making use of the difference in fluorescence lifetime.

The content of the neutron insensitive phosphor (C) in the neutron scintillator of the present invention can be suitably set to a range in which the above effect can be obtained. In order to excite the neutron insensitive phosphor (C) efficiently by energy from the high-speed electron so as to obtain high-intensity emission, the content of the neutron insensitive phosphor (C) is preferably 0.01 mass % or more, particularly preferably 0.1 mass % or more based on 100 mass % of the resin (B). The upper limit of the content of the neutron insensitive phosphor (C) in the neutron scintillator of the present invention is not particularly limited. However, to prevent the reduction of emission intensity due to concentration quenching and secure n/γ discrimination accuracy by observing short-life fluorescence without fail, the content of the neutron insensitive phosphor (C) is preferably 10 mass % or less, more preferably 5 mass % or less, particularly preferably 2 mass % or less based on 100 mass % of the resin (B).

[Other Components]

The neutron scintillator of the present invention comprises the above inorganic phosphor (A) and the resin (B) as essential components and may further comprise the neutron insensitive phosphor (C). As long as the effect of the present invention is not impaired, the neutron scintillator may comprise other components. The above other components include a filler, a dispersant, an antioxidant, a reinforcement material and an organic solvent.

—Filler—

When the inorganic phosphor (A) and the resin (B) in the neutron scintillator of the present invention differ in specific gravity, the inorganic phosphor particles (A) may precipitate or float to be separated in the resin (B) in a molten state or before curing during the production of the neutron scintillator. When this happens, the characteristic properties of the obtained neutron scintillator become nonuniform disadvantageously.

To avoid this and obtain a neutron scintillator having uniform characteristic properties, a filler is added to the composition which will become a neutron scintillator so as to fill the filler particles in spaces formed by the inorganic phosphor particles (A), thereby making it possible to prevent the separation of the inorganic phosphor particles (A).

The filler in use is preferably a filler having the same specific gravity as that of the inorganic phosphor (A). By making the specific gravity of the filler equal to that of the inorganic phosphor, the speeds of precipitation or floating in the resin of the filler particles and the inorganic phosphor particles (A) become close to each other. Therefore, any one of these particles do not precipitate or float first and are not separated from the other. Consequently, the above filler particles are easily and elaborately filled in the spaces formed by the inorganic phosphor particles (A) advantageously. The inorganic phosphor particles (A) are uniformly dispersed into the resin composition by filling the filler particles in the spaces formed by the inorganic phosphor particles (A) statically, thereby improving the uniformity of the neutron scintillator. As for the equal specific gravity, the difference between the specific gravity of the filler and the specific gravity of the inorganic phosphor (A) is ±10% or less.

From the viewpoint that the above filler maintains the high transparency of the obtained resin composition, the refractive index at the emission wavelength of the inorganic phosphor (A) of the above filler is preferably close to the refractive index of the resin (B). More specifically, the ratio of the refractive index of the resin (B) to the refractive index of the inorganic phosphor (A) at the emission wavelength of the inorganic phosphor (A) is preferably 0.95 to 1.05, more preferably 0.98 to 1.02.

The above filler preferably has a smaller size than the inorganic phosphor particles (A) in order to fill the spaces formed by the inorganic phosphor particles (A). It is spherical or indefinite particles which pass through a sieve having an opening size of preferably 100 μm, more preferably 20 μm.

As the filler used in the present invention, organic particles and inorganic particles are used. Examples of the filler include organic particles such as silicone resin, fluororesin, poly(meth)acrylate, polycarbonate, polystyrene, polyvinyl toluene, polyvinyl alcohol, polyethylene and styrene butadiene particles; inorganic particles such as silica, titanium oxide, barium sulfate, calcium fluoride, magnesium fluoride, lithium fluoride, magnesium carbonate, strontium fluoride, mica and glass particles; and particles of an inorganic material of the same type as the inorganic phosphor particles containing no doping element. Particles of an inorganic material of the same type as the inorganic phosphor particles containing no doping element are most preferably used as the filler. Since the inorganic material of the same type as the inorganic phosphor particles (A) has the same specific gravity as that of the inorganic phosphor (A), it has the highest effect of dispersing the inorganic phosphor particles (A) into the resin composition uniformly. Further, since the inorganic material of the same type as the inorganic phosphor particles (A) has the same refractive index as that of the inorganic phosphor (A), it is not difficult to select the resin (B) in consideration of refractive index. A crystalline inorganic material represented by the above chemical formula LiM$^1$M$^2$X$_6$ (Li, M$^1$, M$^2$ and X are as defined above) and not doped with a lanthanoid atom and an alkali metal atom is particularly preferred.

Preferably, the filler used in the present invention contains substantially no neutron capture isotope. When the filler contains a neutron capture isotope, the neutron capture isotope contained in the filler competes with the neutron capture isotope contained in the inorganic phosphor particles (A) to impede a neutron capture reaction caused by the inorganic phosphor particles, whereby the neutron detection efficiency of the neutron scintillator may deteriorate disadvantageously. As long as the neutron capture reaction caused by the inorganic phosphor (A) is not markedly impeded, the filler may contain a neutron capture isotope. According to studies conducted by the inventors of the present invention, when the content of the neutron capture isotope in the filler is 1/10 or less of the content of the neutron capture isotope in the inorganic phosphor (A), the filler can be used without problems. The content of the neutron capture isotope in the filler can be obtained in the same manner as the content of the neutron capture isotope in the inorganic phosphor (A) which has been explained above.

The content of the filler in the neutron scintillator of the present invention is preferably 20 parts or more by volume based on 100 parts by volume of the inorganic phosphor (A). By setting the content of the filler to this range, the effect of suppressing the separation of the inorganic phosphor particles (A) in the resin composition is fully developed. The upper limit of the content of the filler in the neutron scintillator is not particularly limited. Particularly when the volume fraction of the inorganic phosphor (A) is set extremely small in order to significantly improve the n/γ discrimination ability of the neutron scintillator, a large amount of filler particles may be used to disperse the inorganic phosphor particles (A) uniformly. To prevent viscosity from becoming extremely high during the production of the resin composition, the content of the filler is preferably 500 parts or less by volume, more preferably 200 parts or less by volume, particularly preferably 120 parts or less by volume based on 100 parts by volume of the inorganic phosphor (A). The content of the filler is further preferably less than 80 vol %, more preferably less than 50 vol % based on 100 vol % of the whole neutron scintillator.

—Organic Solvent—

To produce the neutron scintillator of the present invention by using a slurry or paste resin composition, the resin composition may further comprise an organic solvent as an optional component. When the resin composition comprises an organic solvent, mixing operation and defoaming operation for the preparation of the resin composition can be easily carried out. This organic solvent may remain in the neutron scintillator as long as the effect of the present invention is not impaired.

Examples of the organic solvent include aromatic hydrocarbons such as toluene and xylene; aliphatic hydrocarbons such as hexane; alcohols such as ethanol; ketones such as acetone; and silicone oil.

The content of the organic solvent in the neutron scintillator of the present invention is preferably 20 mass % or less, more preferably 10 mass % or less based on the total mass of the neutron scintillator. Most preferably, the neutron scintillator of the present invention contains substantially no organic solvent from the viewpoint of time stability.

[Production Process of Neutron Scintillator]

The neutron scintillator of the present invention is composed of a resin composition comprising the above components. By using a slurry, paste or solid resin composition as this resin composition, a slurry, paste or solid neutron scintillator is obtained, respectively. When the slurry or paste resin composition is used, the resin composition may further comprise a suitable organic solvent besides the above components.

Although the production process of the resin composition is not particularly limited, an example thereof is given below.

To produce the resin composition, the inorganic phosphor (A), the resin (B) and optionally other components are mixed together. For mixing, a known mixer such as a propeller mixer, planetary mixer or butterfly mixer may be used without restriction.

Defoaming operation is preferably carried out during the above mixing operation or after the mixing operation. For this defoaming operation, a defoaming device such as vacuum defoaming device or centrifugal defoaming device may be used without restriction. By carrying out the defoaming operation at the time of preparing the resin composition, the resin composition contains no air bubbles, thereby making it possible to suppress light scattering caused by air bubbles with the result of the increased internal transmittance of the resin composition.

Preferably, the above mixing operation and defoaming operation are carried out by using a one-pack type or two-pack type resin precursor as the resin (B) before the precursor is cured (crosslinked) to be converted into the resin (B); the above mixing operation and defoaming operation are carried out by using a thermoplastic resin as the resin (B) at a temperature higher than the plasticizing temperature of the thermoplastic resin; or a resin having fluidity is used as the resin (B).

Further, to increase the efficiencies of the above mixing operation and defoaming operation, the above operations may be carried out after an organic solvent is added to the resin composition to reduce the viscosity of the composition. The organic solvent which may be used herein is the same as the organic solvent which is optionally contained in the neutron scintillator. The content of the organic solvent at the time of the mixing and defoaming operations is not limited and may be adjusted to the viscosity of the composition suitable for these operations as a desired value. The content of the organic solvent is, for example, 1 to 20 mass % based on the total mass of the composition. When the content of the organic solvent at the time of the mixing and defoaming operations exceeds the above range as a preferred content in the neutron scintillator, the removal operation of the organic solvent is preferably carried out to reduce the content of the organic solvent to the above range before use.

When a one-pack or two-pack resin precursor is used as the resin (B) and when a thermoplastic resin is used as the resin (B), the resin composition is cured with the passage of time or by heating, exposure to ultraviolet light, the addition of a catalyst, or the fall of temperature according to the type of the resin (B) in use. Therefore, in these cases, a solid neutron scintillator having a desired shape can be obtained by carrying out the curing of the resin (B) in a mold having a desired shape. Meanwhile, when a resin having fluidity is used as the resin (B), the composition after mixing and defoaming may be used as a slurry or paste neutron scintillator directly or after the removal operation of the organic solvent is carried out as required.

The resin composition in the present invention is preferably solid at a range from room temperature to the use temperature range of the neutron detector from the viewpoints of handling ease and the stability of the resin composition.

<Neutron Detection Method>

In the neutron scintillator of the present invention, the pulse height of fluorescence emitted by the incidence of a neutron is large whereas the pulse height of fluorescence emitted by the incidence of a γ-ray is suppressed. Therefore, by checking the amplitude of the pulse height of emission, it is possible to discriminate between the incidence of a neutron and the incidence of a γ-ray.

When the neutron scintillator of the present invention comprises the neutron insensitive phosphor (C) besides the inorganic phosphor (A) and the resin (B), only the inorganic phosphor (A) emits fluorescence upon the incidence of a neutron and both the inorganic phosphor (A) and the neutron insensitive phosphor (C) emit fluorescence upon the incidence of a γ-ray. Since the emission of the inorganic phosphor (A) and the emission of the neutron insensitive phosphor (C) differ from each other in fluorescence lifetime or emission wavelength, it is possible to discriminate between the incidence of a neutron and the incidence of a γ-ray by checking the waveform or wavelength of emission.

Therefore, the neutron detection method using the neutron scintillator of the present invention is a method (neutron detection method 1) comprising the step of:

comparing the pulse height of emission from the neutron scintillator with a predetermined threshold value to discriminate the emission from the neutron scintillator as emission caused by a neutron when the pulse height is larger than the threshold value and as emission caused by a γ-ray when the pulse height is smaller than the threshold value; or a method (neutron detection method 2) using a neutron scintillator which comprises a neutron insensitive phosphor (C) besides an inorganic phosphor (A) and a resin (B), comprising the step of:

discriminating the emission from the neutron scintillator as emission caused by a neutron when it is only emission from the inorganic phosphor (A) and as emission caused by a γ-ray when it includes emission from the neutron insensitive phosphor (C).

Each of the above methods will be described in detail hereinunder.

—Neutron Detection Method 1—

The neutron detection method 1 is a method for counting only emission caused by the incidence of a neutron, comprising the step of:

discriminating between the incidence of a neutron and the incidence of a γ-ray by checking the amplitude of the pulse height of fluorescence emitted from the neutron scintillator. More specifically, the method comprises the step of:

comparing the pulse height of emission from the neutron scintillator with a predetermined threshold value to discriminate the emission as emission caused by a neutron when the pulse height is larger than the threshold value and as emission caused by a γ-ray when the pulse height is smaller than the threshold value.

The above threshold value can be set as follows.

An experimentally produced neutron ray is irradiated on a neutron detector obtained by connecting the neutron scintillator to a photodetector to record the pulse height (signal intensity) of a pulse signal output from the photodetector. A certain number of data (for example, 10,000 or more data) on this signal are collected to fit the pulse heights with a normal distribution function so as to obtain dispersion ($\sigma$). The threshold value is obtained by subtracting preferably a double to triple of the dispersion ($\sigma$) from the most frequent pulse height.

In the actual measurement, only emission having a pulse height of the above threshold value or more out of the detected emissions of fluorescence is counted as emission caused by a neutron, and emission having a pulse height smaller than the threshold value may be treated as noise as it is considered as emission caused by a γ-ray.

—Neutron Detection Method 2—

The neutron detection method 2 may be adopted when the neutron scintillator comprises the neutron insensitive phosphor (C) besides the inorganic phosphor (A) and the resin (B). When fluorescence is emitted from this neutron scintillator, the method is to count only emission caused by the incidence of a neutron, comprising the step of discriminating between the incidence of a neutron and the incidence of a γ-ray by checking whether the emission is only emission from the inorganic phosphor (A) or includes emission from the neutron insensitive phosphor (C). More specifically, there are the following two methods as examples of the above method.

They are a method in which, when it is found that the emission is only long-life emission by checking the waveform (signal waveform) of fluorescence emitted from the neutron scintillator, it is discriminated as emission caused by a neutron since it is only emission from the inorganic phosphor (A), and when it is found that the emission includes short-life emission, it is discriminated as emission caused by a γ-ray since it includes emission from the neutron insensitive phosphor (C) (neutron detection method 2-1); and a method in which, when it is found that the emission is only light having the emission wavelength of the inorganic phosphor (A) by checking the wavelength of fluorescence emitted from the neutron scintillator, it is discriminated as emission caused by a neutron since it is only emission from the inorganic phosphor (A), and when it is found that the emission includes light having the emission wavelength of the neutron insensitive phosphor (C) besides light having the emission wavelength of the inorganic phosphor (A), it is discriminated as emission caused by a γ-ray since it includes emission from the neutron insensitive phosphor (C) (neutron detection method 2-2).

In the neutron detection method 2-1, it is possible to discriminate between only emission from the inorganic phosphor (A) and emission including emission from the neutron insensitive phosphor (C) by checking temporal profiles in the intensity of the emission.

In the neutron detection method 2-2, when there is the emission of fluorescence, by checking the wavelength of the emission, discrimination between emission from the inorganic phosphor (A) in use or emission from the neutron insensitive phosphor (C) shall be made.

<Neutron Detector>

The neutron detector of the present invention is a device for implementing the above neutron detection method.

The neutron detector of the present invention comprises the above neutron scintillator of the present invention, a photodetector and discrimination means for discriminating between a signal produced by a neutron and a signal produced by a γ-ray.

Light emitted from the neutron scintillator by the incidence of a neutron or a γ-ray is converted into an electric signal by the photodetector. This electric signal is discriminated as a signal produced by a neutron or a signal produced by a γ-ray by the discrimination means so that only the signal produced by a neutron is counted to calculate the number of neutrons.

Preferably, the neutron scintillator in the neutron detector of the present invention has a light emission surface opposed to the photodetector, and the light emission surface is preferably a flat surface. Since the neutron scintillator has such a light emission surface, light produced by the neutron scintillator can be made incident on the photodetector efficiently. A light reflection film is preferably attached to surfaces not opposed to the photodetector of the neutron scintillator. Thereby, the dissipation of light produced by the neutron scintillator can be prevented advantageously. Examples of the material of the above light reflection film include aluminum and polytetrafluoroethylene.

The neutron scintillator is optically bonded to the light detection surface of the photodetector through the light emission surface. For optical bonding between them, optical grease or optical cement may be used, or they may be interconnected by an optical fiber. An optical filter may be installed between the neutron scintillator and the photodetector. One or more photodetectors may be installed.

The photodetector in the neutron detector of the present invention is not particularly limited. Conventionally known photodetectors such as photomultiplier tube, photodiode, Avalanche photodiode and Geiger mode Avalanche photodiode may be used without restriction.

It is also preferred that position resolution should be provided to the neutron detector of the present invention by using a position sensitive photodetector as the photodetector. This embodiment will be described in detail in Example 9 which will be described hereinafter.

The above photodetector is connected to a power source and further to the discrimination means to constitute the neutron detector of the present invention.

The above discrimination means judges whether the electric signal is produced by a neutron or a γ-ray according to the pulse height of the electric signal from the photodetector or the lifetime of the electric signal or wavelength.

The neutron detector having discrimination means for carrying out discrimination according to the pulse height of the above electric signal implements the above neutron detection method 1. The neutron scintillator used in this case should comprise the inorganic phosphor (A) and the resin (B) and may or may not comprise the neutron insensitive phosphor (C).

A pulse height analyzing mechanism is used as the discrimination means in this case. Conventionally known pulse height analyzing mechanisms may be used as this pulse height analyzing mechanism without restriction. As the pulse height analyzing mechanism, a pulse height analyzing mechanism comprising a discriminator is the most simple and preferred.

The pulse height analyzing mechanism comprising a discriminator is composed of an amplifier, a discriminator and a counter. The above predetermined threshold value is set in the discriminator, and an output signal from the photodetector is input into the discriminator through the amplifier. The discriminator outputs a logic pulse only when the input signal exceeds the set threshold value. Therefore, the incidence frequency of neutrons can be measured by inputting the logic pulse from the above discriminator into the counter to count it.

Meanwhile, the neutron detector including discrimination means for carrying out discrimination according to the lifetime or wavelength of the above electric signal implements the above neutron detection method 2. The neutron scintillator used in this case comprises the neutron insensitive phosphor (C) besides the inorganic phosphor (A) and the resin (B).

The discrimination means for carrying out discrimination according to the lifetime of the electric signal is a waveform analyzing mechanism. This waveform analyzing mechanism is composed of a preamplifier, a main amplifier, a waveform analyzer and a time-to-amplitude converter.

An electric signal output from the photodetector is input into the main amplifier through the preamplifier of a signal readout circuit to be amplified and shaped. The intensity of an output signal from the main amplifier increases with time. The time required for this increase (rise time) reflects the lifetime of fluorescence emitted from the neutron scintillator. As the fluorescence lifetime is shorter, the rise time is shorter and as the fluorescence lifetime is longer, the rise time is longer. To analyze this rise time, an output signal from the main amplifier is input into the waveform analyzer.

The waveform analyzer carries out the time integration of a signal output from the main amplifier and outputs logic signals when the intensity of the time integrated signal exceeds two predetermined threshold values. The two threshold values are set in the wave analyzer and therefore, a first logic signal and a second logic signal are output at a certain time interval. Out of these threshold values, a first threshold value is set to, for example, a value which is 0.05 to 0.3 times the pulse height. A second threshold value is set to, for example, a value which is 0.7 to 0.95 times the pulse height. Therefore, the time difference between the first logic signal and the second logic signal reflects the rise time of the signal output from the main amplifier.

Then, the two logic signals output from the above waveform analyzer are input into the time-to-amplitude converter (TAC). This time-to-amplitude converter converts the time difference between the two logic signals output from the wave analyzer into a pulse amplitude and outputs it. Since this pulse amplitude reflects the rise time of the signal output from the main amplifier, it reflects the lifetime of fluorescence emitted from the neutron scintillator.

Therefore, it is possible to judge whether the emission of fluorescence producing the pulse signal is long-life emission from the inorganic phosphor (A) or short-life emission from the neutron insensitive phosphor (C) by comparing the above pulse amplitude with a predetermined threshold value. The threshold value in this case may be a value obtained by collecting a certain number of pulse amplitude data (for example, 10,000 data or more), fitting the pulse amplitude value with a normal distribution function to obtain dispersion (σ) and subtracting preferably a double or triple of the dispersion (σ) from the most frequent value of the above pulse amplitude.

The discrimination means for carrying out discrimination according to the wavelength of the electric signal is a wavelength analyzing mechanism.

The neutron detector comprising the wavelength analyzing mechanism is composed of the neutron scintillator of the present invention, a first photodetector optically connected to the neutron scintillator not through an optical filter, a second photodetector optically connected to the neutron scintillator through an optical filter, and discrimination means which is a wavelength analyzing mechanism. In this embodiment, part of light emitted from the neutron scintillator is guided into the first photodetector not through an optical filter and part of the rest is guided into the second photodetector through an optical filter.

The inorganic phosphor (A) emits light having a wavelength A (nm) and the neutron insensitive phosphor (C) emits light having a wavelength B (nm) different from A (nm). Then, as described above, since only the inorganic phosphor (A) emits fluorescence when a neutron enters the neutron scintillator, only light having a wavelength A (nm) is emitted from the neutron scintillator, and since both the inorganic phosphor (A) and the neutron insensitive phosphor (B) emit fluorescence when a γ-ray enters the neutron scintillator, fluorescence having two wavelengths A (nm) and B (nm) are emitted from the neutron scintillator.

In this embodiment, the above optical filter blocks light having a wavelength A (nm) and transmits light having a wavelength B (nm). Therefore, light having a wavelength A (nm) emitted from the neutron scintillator reaches the first photodetector but not the second photodetector as it is blocked by the optical filter.

In the neutron detector having such constitution, since only light having a wavelength A (nm) produced by the inorganic phosphor (A) is emitted from the neutron scintillator when a neutron is irradiated, the first photodetector detects only light having a wavelength A (nm). Meanwhile, since light having a wavelength A (nm) produced by the inorganic phosphor (A) and light having a wavelength B (nm) produced by the neutron insensible phosphor (C) are emitted from the neutron scintillator at the same time when a γ-ray is irradiated, the first photodetector detects light having a wavelength A (nm) and the second photodetector detects light having a wavelength B (nm).

Therefore, when light having a wavelength A (nm) enters the first photodetector and a signal is output from the first photodetector, if light does not enter the second photodetector and a signal is not output from the second photodetector, it can be judged that this is an event caused by a neutron. When light having a wavelength A (nm) enters the first photodetector and a signal is output from the first photodetector, if light having a wavelength B (nm) enters the second photodetector and a signal is output from the second photodetector, it can be judged that this is an event caused by a γ-ray.

Therefore, the discrimination means which is a wavelength analyzing mechanism in this embodiment is a circuit which judges the existence or absence of a signal from the second photodetector when a signal is input from the first photodetector. Examples of this circuit include an anticoincidence circuit and a gate circuit.

EXAMPLES

The following examples are provided for the purpose of further illustrating the present invention but are in no way to be taken as limiting. All the combinations of characteristic properties described in Examples are not always essential to the solution of the present invention.

Example 1

In this example, a neutron scintillator and a neutron detector were manufactured by using inorganic phosphor particles composed of an Eu:LiCaAlF$_6$ crystal doped with 0.04 mol % of Eu as an inorganic phosphor, filler particles composed of a LiCaAlF$_6$ crystal as a filler, and silicone resin (KER-7030 of Shin-Etsu Chemical Co., Ltd.) as a resin.

[Inorganic Phosphor]

The Eu:LiCaAlF$_6$ crystal used as the inorganic phosphor in this example contained only lithium 6 as a neutron capture isotope and had a density of 3.0 g/cm$^3$, a lithium mass fraction of 3.2 mass %, a lithium 6 isotope ratio of 95%, a neutron capture isotope content of 9.1 atoms/nm$^3$ and a wavelength of emission caused by σ irradiation of 370 nm.

The above neutron capture isotope content is a value obtained by substituting the lithium 6 isotope ratio into the above formula (1), and the wavelength of emission caused by σ irradiation is a value obtained by measuring the wavelength of fluorescence produced by using $^{241}$Am as an α-ray source with a fluorescent photometer.

An Eu:LiCaAlF$_6$ crystal bulk body of indefinite shape of about 2 cm cube was first prepared, ground with a hammer mill and classified by dry classification. The obtained particles were let pass through a 200 µm upper sieve and a fraction remaining on a 100 µm lower sieve was collected to obtain indefinite inorganic phosphor particles. The specific surface area of the inorganic phosphor particles based on mass measured with a BET specific surface meter was 0.015 m$^2$/g, and the specific surface area based on volume was therefore 450 cm$^2$/cm$^3$.

[Filler]

The LiCaAlF$_6$ crystal used as the filler in this example had a density of 3.0 g/cm$^3$, a lithium mass fraction of 3.7 mass %, a lithium 6 isotope ratio of 7.6% and a neutron capture isotope content of 0.73 atom/nm$^3$.

As the filler, as in the case of the above inorganic phosphor, particles obtained by grinding a LiCaAlF$_6$ crystal bulk body and passing the obtained particles through a 100 µm sieve were used.

[Resin]

The silicone resin used as the resin in this example was KER-7030 manufactured by Shin-Etsu Chemical Co., Ltd. This consists of 2 liquids which are liquid A and liquid B and can be used by mixing together equal amounts of these liquids to prepare a resin precursor and curing it by heating. The cured resin is a transparent resin having an internal transmittance of 95%/cm at 370 nm which is the emission wavelength of the above inorganic phosphor Eu:LiCaAlF$_6$ crystal.

[Refractive Index]

The refractive indices at room temperature and a wavelength of 370 nm of the above materials used in this example were measured with a refractometer. As the light source of the refractometer, i-line (365.0 nm) and h-line (404.7 nm) of an Hg lamp were used. As samples, bulk bodies having a shape suitable for refractive index measurement were used.

The wavelength values of i-line and h-line and the value of refractive index measured at each wavelength of each sample were substituted into the above Sellmeier formula (formula (4)) to obtain constants A and B. Thereafter, these constants and a wavelength of 370 nm were substituted into that formula to calculate the refractive index of each material at a wavelength of 370 nm. The results are given below.

| | |
|---|---|
| Eu:LiCaAlF$_6$ crystal | 1.40 |
| LiCaAlF$_6$ crystal | 1.40 |
| Resin | 1.41 |

Therefore, the ratio of refractive index of the resin to the refractive index of the inorganic phosphor and the ratio of the refractive index of the transparent resin to the refractive index of the filler at 370 nm were 1.01.

[Production of Neutron Scintillator]

10.0 g (3.33 cm$^3$) of inorganic phosphor particles composed of the above Eu:LiCaAlF$_6$ crystal, 10.0 g (3.33 cm$^3$) of filler particles composed of the above LiCaAlF$_6$ crystal and 10.0 mL of a resin precursor of the above silicone resin prepared by mixing together equal amounts of liquid A and liquid B were injected into a mixing vessel, and 1 mL of toluene was added. After the contents of the vessel were mixed well by using a stirring rod, the resulting mixture was defoamed by using a vacuum defoaming device.

Then, after the above mixture was injected into two polytetrafluoroethylene molds (diameter of 2 cm, thickness of about 0.3 cm; diameter of 2 cm, thickness of about 1 cm) and heated at 80° C. for 5 hours to distill off toluene, the residue was heated at 100° C. for 2 hours to be cured, thereby obtaining two cylindrical neutron scintillators which differed in size.

The volume fraction of the inorganic phosphor and the content of the filler in the obtained neutron scintillator were calculated as follows from the charge volumes of the above inorganic phosphor particles, filler particles and silicone resin.

| Volume fraction of inorganic phosphor | 20 vol % |
|---|---|
| Content of filler | 100 vol % based on volume of inorganic phosphor |

[Evaluation of Neutron Scintillator]

The internal transmittance based on 1 cm of the optical path length at the emission wavelength (370 nm) of the inorganic phosphor of the neutron scintillator obtained above was measured by the following method.

Light having a wavelength of 370 nm was first made incident on the light detection surface of a photodetector to measure the intensity ($I_0$) of the incident light (FIG. 1(a)).

Then, the neutron scintillator having a thickness of 0.3 cm manufactured as described above was mounted on the light detection surface of the photodetector and light having a wavelength of 370 nm was made incident on the neutron scintillator so as to measure the intensity ($I_1$) of light incident on the photodetector through the neutron scintillator having a thickness of 0.3 cm ($d_1$) (FIG. 1(b)). The light transmittance ($T_1$) including a surface reflection loss of the neutron scintillator was obtained by dividing this light intensity $I_1$ by $I_0$. Similarly, the light transmittance ($T_2$) including a surface reflection loss of a neutron scintillator having a thickness ($d_2$) of 1 cm was obtained by measuring the intensity ($I_2$) of light incident on the photodetector through the neutron scintillator.

When these values $d_1$, $d_2$, $T_1$ and $T_2$ were substituted into the above formula (3) to obtain the internal transmittance based on 1 cm of the optical path length, it was 67%/cm.

[Manufacture of Neutron Detector]

A neutron detector was manufactured by using the cylindrical neutron scintillator having a diameter of 2 cm and a thickness of 0.3 cm which was produced above.

One of the bottom surfaces of the neutron scintillator was used as a light emission surface, and a polytetrafluoroethylene tape was wound round surfaces other than the light emission surface to form a light reflection film. A photomultiplier tube (H6521 of Hamamatsu Photonics K.K.) was prepared as a photodetector, and the light detection surface of the photomultiplier tube and the light emission surface of the above neutron scintillator were optically bonded together by using optical grease.

Then, the above neutron scintillator and the photomultiplier tube were covered with a light shielding black sheet. As a signal read-out circuit, a preamplifier, a shaping amplifier and a multiple pulse height analyzer were connected to the photomultiplier tube in this order, and a power source was connected to the photomultiplier tube to manufacture a neutron detector.

[Evaluation of Neutron Detector]

The performance of the neutron detector which was manufactured as described above was evaluated by the following method.

First of all, a pulse height distribution spectrum was measured when a neutron was made incident on the above neutron detector.

Cf-252 having a radioactivity of 2.4 MBq as a neutron source was placed at the center of 20 cm cubic high-density polyethylene, and the neutron detector was placed such that the neutron scintillator was situated in proximity to the high-density polyethylene. A neutron produced from the above Cf-252 was moderated by the high-density polyethylene and then irradiated to the neutron scintillator of the neutron detector. A high voltage of −1,300 V was applied to the photomultiplier tube from the power source connected to the photomultiplier tube. After light emitted from the neutron scintillator by the incidence of the neutron was converted into a pulse electric signal by the photomultiplier tube, the electric signal was input into the multiple pulse height analyzer through the preamplifier and the shaping amplifier to obtain a pulse height distribution spectrum.

Then, a pulse height distribution spectrum when a γ-ray was made incident on the neutron detector was measured.

A pulse height distribution spectrum was obtained in the same manner as above except that Co-60 having a radioactivity of 0.83 MBq as a γ-ray source was placed at a position 5 cm away from the neutron scintillator of the neutron detector to apply a γ-ray from the above Co-60 to the neutron scintillator of the neutron detector. It is noted that the γ-ray dose at a position 5 cm away from Co-60 having a radioactivity of 0.83 MBq was 10 mR/h which is extremely large.

Figure 2:
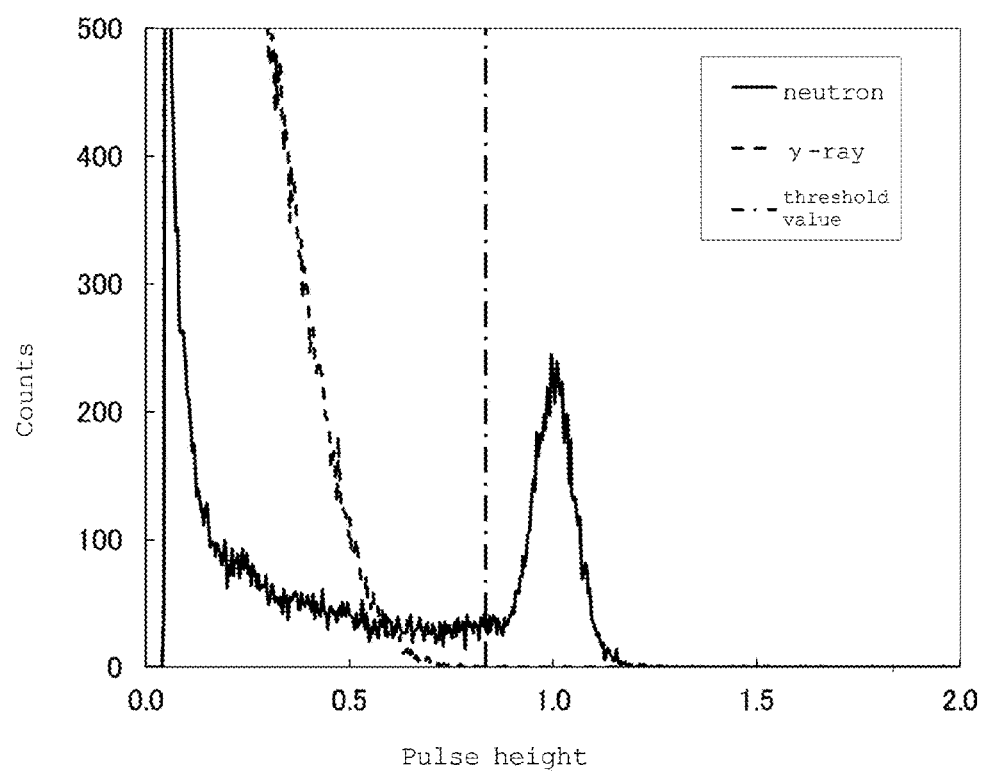
FIG. 2 shows pulse height distribution spectra obtained in Example 1.

Two pulse height distribution spectra obtained by the above operation are shown in FIG. 2. The solid line of FIG. 2 shows a pulse height distribution obtained by neutron irradiation, and the dashed line shows a pulse height distribution obtained by γ irradiation. The abscissa axis shows a relative value when the pulse height of a neutron peak is 1.

In FIG. 2, a clear neutron peak can be confirmed whereas the pulse height obtained by a γ-ray is extremely small. Therefore, according to the present invention, it is understood that it is possible to easily discriminate between a neutron and a γ-ray.

Dispersion (σ) was obtained by fitting the above neutron peak with a normal distribution function to set a pulse height 3σ lower than the pulse height of a neutron peak as a threshold value. The threshold value is shown by the dashed-dotted line in FIG. 2. When a neutron was irradiated and when a γ-ray was irradiated under the same conditions as above, the number of signals exceeding the threshold value was counted for 300 seconds to obtain the counting rate (counts/sec). The results are shown in Table 1. It is understood from Table 1 that the γ-ray counting rate (counts/sec) of the neutron detector of this example is reduced to an extremely low level even in the presence of an extremely large γ-ray dose. Therefore, this neutron detector has an extremely small disturbing error caused by a γ-ray in neutron counted value.

Examples 2 and 3

In these examples, a neutron scintillator and a neutron detector were manufactured by using the same inorganic phosphor, filler and resin as those of Example 1 and evaluated in the same manner as in Example 1 except that the ratio of components used in [production of neutron scintillator] was changed as shown in Table 1.

The evaluation results are shown in Table 1. The content of the filler in Table 1 is based on the volume of the inorganic phosphor.

Figure 3:
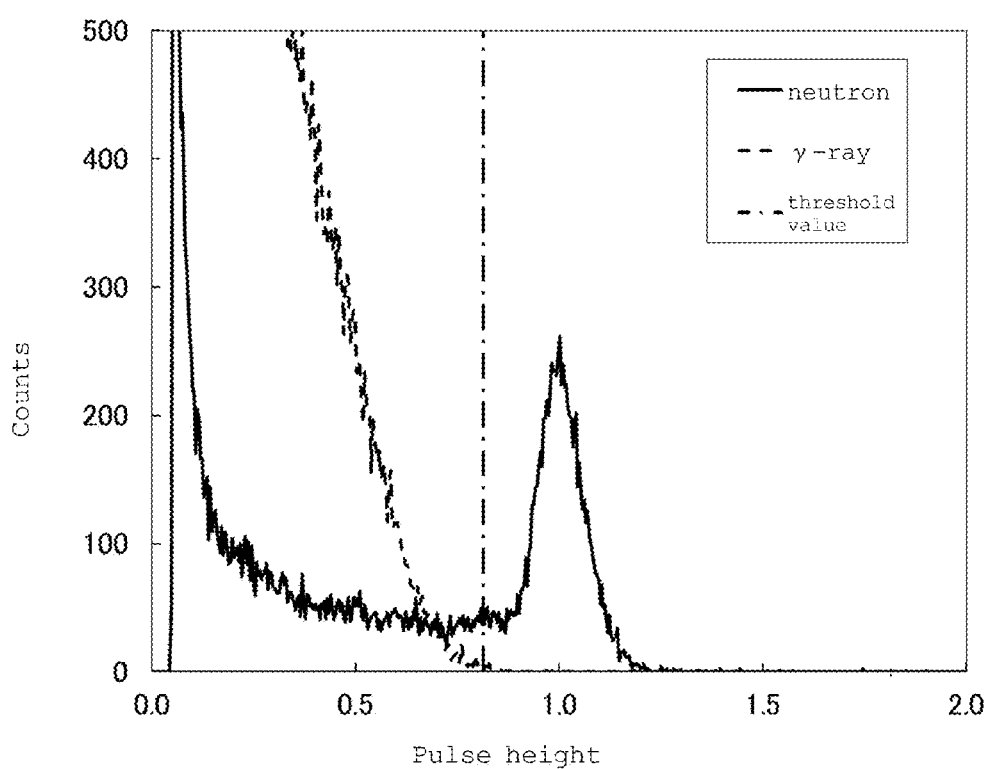
FIG. 3 shows pulse height distribution spectra obtained in Example 2.
Figure 4:
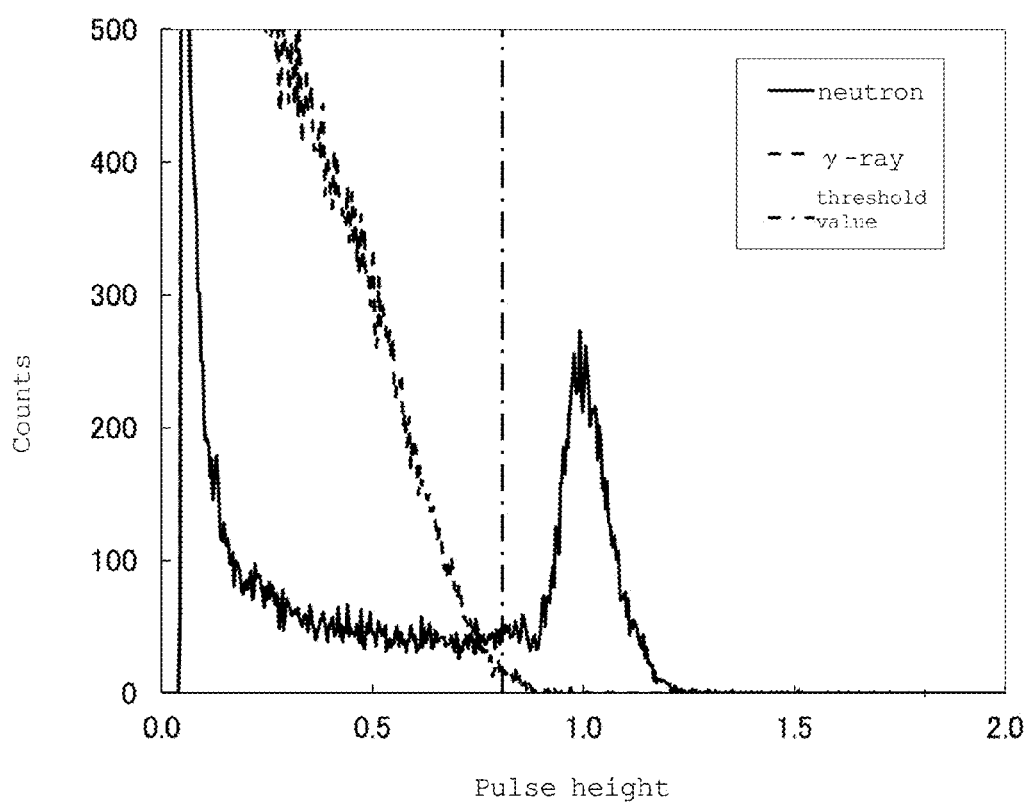
FIG. 4 shows pulse height distribution spectra obtained in Example 3.

Neutron and γ-ray pulse height distribution spectra are shown in FIG. 3 (Example 2) and FIG. 4 (Example 3), respectively. In FIG. 3 and FIG. 4, a clear neutron peak can be confirmed, and it is seen that the pulse height obtained by a γ-ray is extremely small.

It is understood from the results of the above Examples 1 to 3 that as the volume fraction of the inorganic phosphor in the neutron scintillator becomes higher, neutron detection efficiency becomes higher. Meanwhile, it is also seen that as the volume fraction of the inorganic phosphor becomes lower, n/γ discrimination ability becomes more excellent.

Examples 4 and 5

In these examples, a neutron scintillator and a neutron detector were manufactured by using the same types and the same amounts of the inorganic phosphor, filler and resin as those of Example 1 and evaluated in the same manner as in Example 1 except that the specific surface area of the inorganic phosphor particle used in [production of neutron scintillator] was changed as shown in Table 1 and further the size of the filler particle was changed as follows in Example 5.

In Example 4, an $Eu:LiCaAlF_6$ crystal bulk body was first prepared and cut to obtain 1 mm cubic inorganic phosphor particles. The specific surface area based on volume of each of the inorganic phosphor particles was 60 $cm^2/cm^3$.

In Example 5, an $Eu:LiCaAlF_6$ crystal bulk body of indefinite shape of about 2 cm cube was first prepared, ground with a hammer mill and classified by dry classification. The obtained particles were let pass through a 100 μm upper sieve and a fraction remaining on a 50 μm lower sieve was collected to obtain indefinite inorganic phosphor particles. The specific surface area of the inorganic phosphor particles based on mass measured with a BET specific surface meter was 0.040 $m^2/g$, and the specific surface based on volume was therefore 1,200 $cm^2/cm^3$. As the filler, particles obtained by grinding a $LiCaAlF_6$ crystal bulk body and passing the obtained pieces through a 50 μm sieve in the same manner as the above inorganic phosphor were used.

Figure 5:
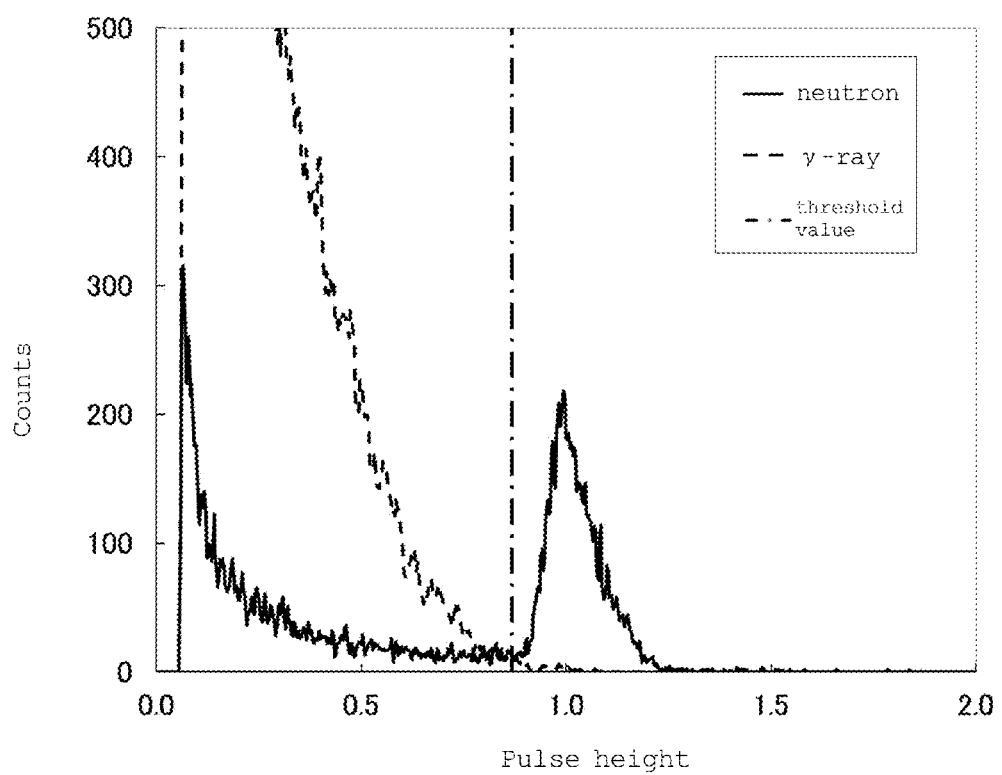
FIG. 5 shows pulse height distribution spectra obtained in Example 4.
Figure 6:
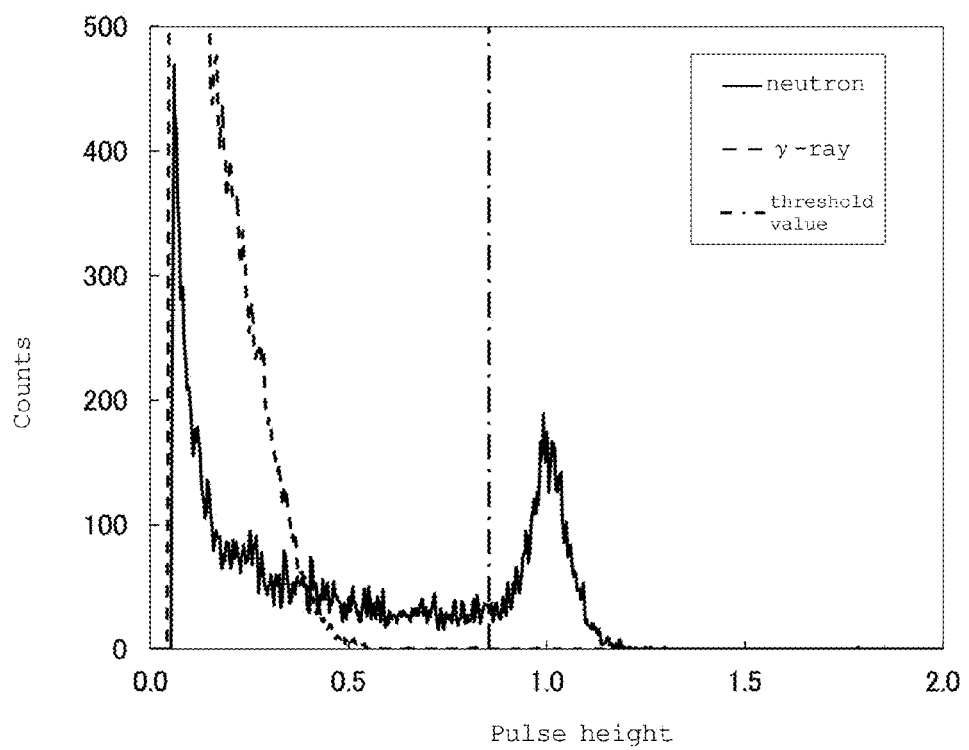
FIG. 6 shows pulse height distribution spectra obtained in Example 5

The evaluation results are shown in Table 1. Neutron and γ-ray pulse height distribution spectra are shown in FIG. 5 (Example 4) and FIG. 6 (Example 5), respectively. A clear neutron peak can be confirmed in FIG. 5 and FIG. 6, and it is seen that the pulse height obtained by a γ-ray is extremely small.

It is understood from the results of the above Examples 1, 4 and 5 that as the specific surface area of each of the inorganic phosphor particles in the neutron scintillator becomes smaller, neutron detection efficiency becomes higher. Meanwhile, it is understood that as the specific surface area of the inorganic phosphor becomes larger, n/γ discrimination ability becomes more excellent.

Comparative Example 1

A neutron detector was manufactured and evaluated in the same manner as in Example 1 except that a rectangular parallelepiped $Eu:LiCaAlF_6$ single crystal measuring 1 cm×1 cm×0.3 cm and having a specific surface area of 11 $cm^2/cm^3$ was used as a neutron scintillator and one of 1 cm×1 cm surfaces was used as a light emission surface. The $Eu:LiCaAlF_6$ single crystal used herein was obtained by cutting the same 0.04 mol %-$Eu:LiCaAlF_6$ crystal as that used in Example 1 to the above size and mirror-finishing all of its surfaces. For the measurement of internal transmittance, a 1 cm×1 cm×1 cm cubic $Eu:LiCaAlF_6$ single crystal was prepared in the same manner as described above and used.

Figure 7:
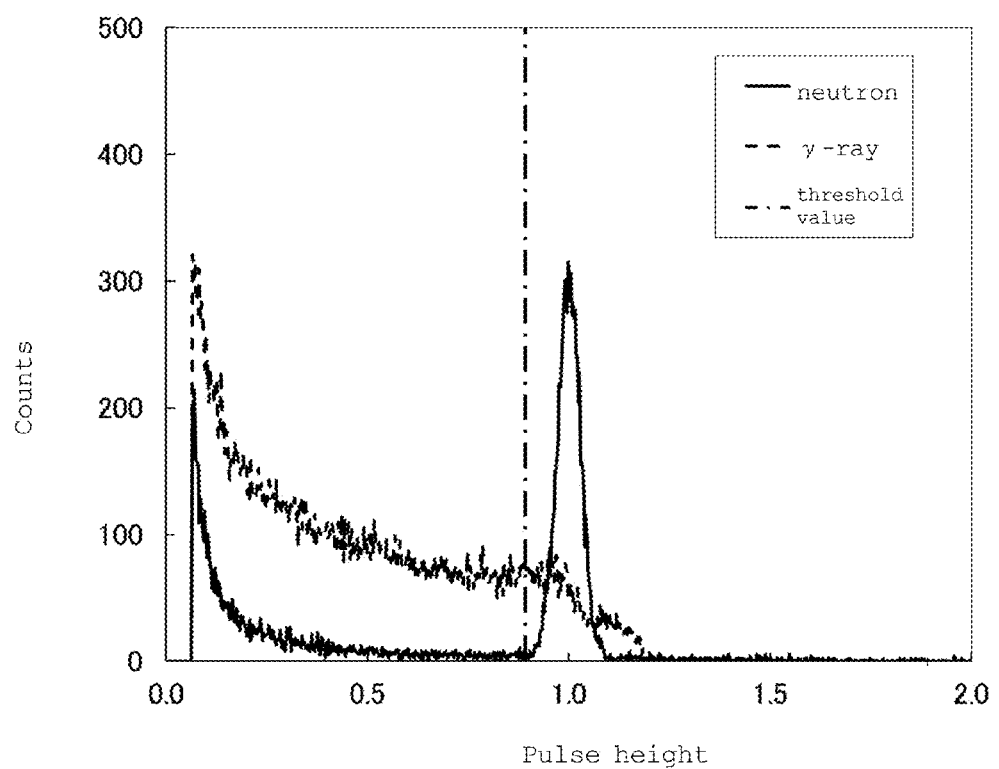
FIG. 7 shows pulse height distribution spectra obtained in Comparative Example 1.

The evaluation results are shown in Table 1, and neutron and γ-ray pulse height distribution spectra are shown in FIG. 7. It is understood from FIG. 7 that although a clear neutron peak can be confirmed, the pulse height of an electric signal produced by a γ-ray partially overlaps with the neutron peak, thereby making it difficult to discriminate between a neutron and a γ-ray. In Table 1, the counting rate of a γ-ray in the presence of a large γ-ray dose becomes 17 counts/sec, whereby a disturbing error caused by a γ-ray in neutron counted value becomes a significant problem.

Comparative Example 2

This comparative example is an example in which the refractive index of the resin in Example 2 was changed.

A neutron scintillator and a neutron detector were manufactured and evaluated in the same manner as in Example 2 except that silicone resin having a refractive index at room temperature and 370 nm of 1.62 was used as the resin in Example 2. The ratio of the refractive index of the resin to the refractive index of the inorganic phosphor and the ratio of the refractive index of the resin to the refractive index of the filler were both 1.19.

Figure 8:
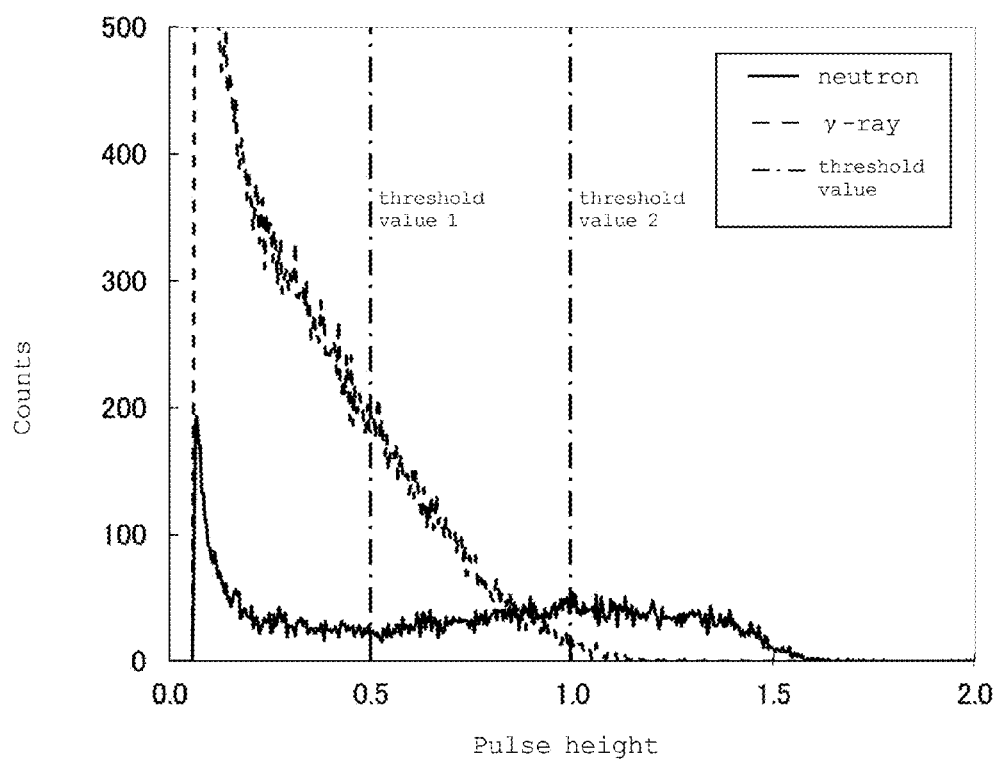
FIG. 8 shows pulse height distribution spectra obtained in Comparative Example 2.

The evaluation results are shown in Table 1, and neutron and γ-ray pulse height distribution spectra are shown in FIG. 8. It is understood from Table 1 that this neutron scintillator has a low transmittance. Therefore, as seen in FIG. 8, the pulse height of a signal produced by the incidence of a neutron is small and variations in the pulse height are large. Therefore, a clear neutron peak cannot be confirmed, and the obtained neutron scintillator cannot be used as a neutron scintillator which is excellent in neutron detection efficiency and n/γ discrimination ability.

FIG. 8 shows two threshold values. In the case of threshold value 1, although neutron detection efficiency is acceptable, a disturbing error caused by a γ-ray in neutron counted value becomes a significant problem. In the case of threshold value 2, the neutron counted value is extremely small and the desired neutron detection efficiency of the present invention cannot be achieved. As for neutron and γ-ray counted values in Table 1, the upper value is a counted value calculated by using the threshold value 1 and the lower value is a counted value calculated by using the threshold value 2.

Comparative Example 3

This comparative example is an example in which the specific surface area of the inorganic phosphor in Example 2 was changed.

An $Eu:LiCaAlF_6$ crystal bulk body of indefinite shape of about 2 cm cube was first prepared, ground with a hammer mill and finely ground with a ball mill to obtain indefinite inorganic phosphor particles. The specific surface area of the inorganic phosphor particles based on mass measured with a BET specific surface meter was 0.11 $m^2/g$, and the specific surface area based on volume was therefore 3,300 $cm^2/cm^3$. A neutron scintillator and a neutron detector were manufactured and evaluated in the same manner as in Example 2 except that the above inorganic phosphor particles were used.

Figure 9:
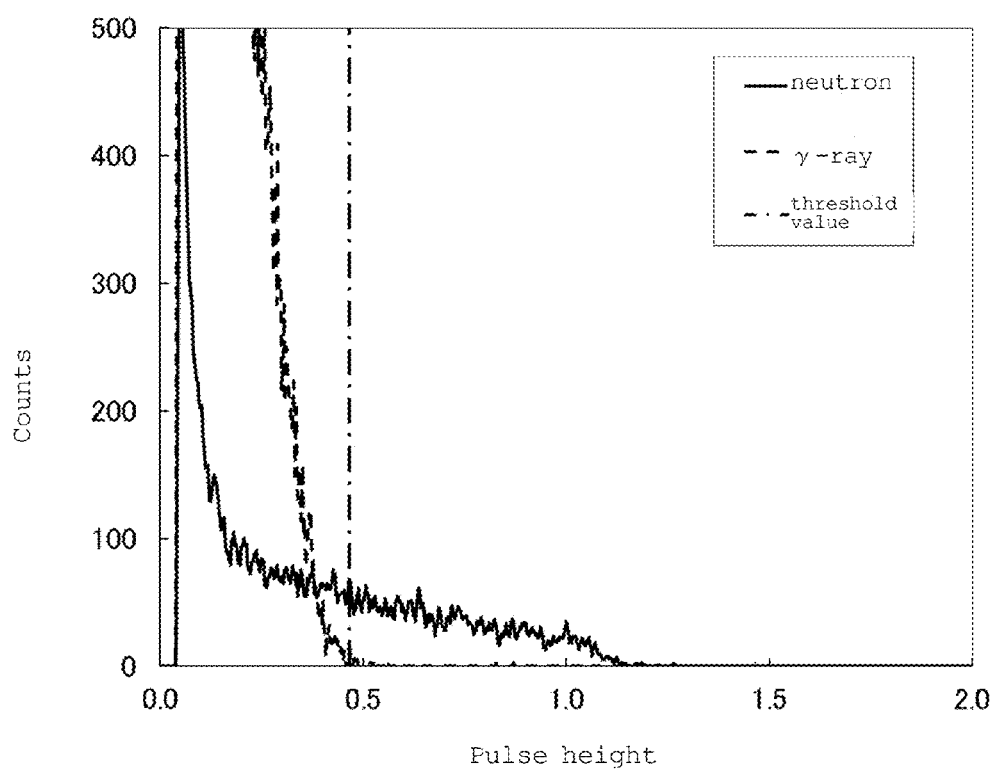
FIG. 9 shows pulse height distribution spectra obtained in Comparative Example 3.

The evaluation results are shown in Table 1, and neutron and γ-ray pulse height distribution spectra are shown in FIG. 9. In FIG. 9, a clear neutron peak in the pulse height distribution obtained by neutron irradiation cannot be confirmed. It is considered that this is because the specific surface area of the inorganic phosphor particle used in this comparative example exceeds the predetermined range of the present invention and the particle size becomes too small. That is, it is considered that there frequently occurred a phenomenon that a secondary particle produced by a neutron capture reaction caused by lithium 6 deviates from the inorganic phosphor particles before it provides all of its energy to the inorganic phosphor particles. When this phenomenon occurs, the amount of energy provided to the inorganic phosphor from the secondary particle becomes small, thereby impairing the emission intensity of the inorganic phosphor.

In FIG. 9, a threshold value cannot be set based on the neutron peak. However, the threshold value was set to the position of the dashed-dotted line so that the γ-ray counted value became equal to that of Example 2. Then, it is understood that the neutron counted value becomes smaller than that of Example 2 and that the neutron detector of this comparative example is inferior to the neutron detector of Example 2 in performance.

Example 6

In this example, a neutron scintillator and a neutron detector were manufactured by using inorganic phosphor particles composed of a Eu:LiSrAlF$_6$ crystal doped with 0.04 mol % of Eu as the inorganic phosphor, filler particles composed of a LiSrAlF$_6$ crystal as the filler and silicone resin (KER-7030 of Shin-Etsu Chemical K.K.) as the resin.

[Inorganic Phosphor]

The Eu:LiSrAlF$_6$ crystal used as the inorganic phosphor in this example contained only lithium 6 as a neutron capture isotope and had a density of 3.5 g/cm$^3$, a lithium mass fraction of 2.6 mass %, a lithium 6 isotope ratio of 95%, a neutron capture isotope content of 8.4 atoms/nm$^3$ and a wavelength of emission caused by σ irradiation of 380 nm.

The above neutron capture isotope content is a value obtained by substituting the lithium 6 isotope ratio into the above formula (1), and the above wavelength of emission caused by σ irradiation is a value obtained by measuring the wavelength of fluorescence emitted by using $^{241}$Am as an α-ray source with a fluorophotometer.

TABLE 1

| | Type of inorganic phosphor (specific surface area) | amount of each component | | | volume fraction of inorganic phosphor (%) | content of filler (%) | internal transmittance (%/cm) |
|---|---|---|---|---|---|---|---|
| | | Inorganic phosphor | filler | resin | | | |
| Ex. 1 | Eu:LiCaAlF$_6$ (450 cm$^2$/cm$^3$) | 10.0 g (3.33 cm$^3$) | 10.0 g (3.33 cm$^3$) | 10 mL (refractive index 1.41) | 20 | 100 | 67 |
| Ex. 2 | Eu:LiCaAlF$_6$ (450 cm$^2$/cm$^3$) | 12.5 g (4.17 cm$^3$) | 7.5 g (2.50 cm$^3$) | 10 mL (refractive index 1.41) | 25 | 60 | 71 |
| Ex. 3 | Eu:LiCaAlF$_6$ (450 cm$^2$/cm$^3$) | 14.9 g (4.97 cm$^3$) | 5.0 g (1.67 cm$^3$) | 10 mL (refractive index 1.41) | 33 | 30 | 70 |
| Ex. 4 | Eu:LiCaAlF$_6$ (60 cm$^2$/cm$^3$) | 10.0 g (3.33 cm$^3$) | 10.0 g (3.33 cm$^3$) | 10 mL (refractive index 1.41) | 20 | 100 | 70 |
| Ex. 5 | Eu:LiCaAlF$_6$ (1200 cm$^2$/cm$^3$) | 10.0 g (3.33 cm$^3$) | 10.0 g (3.33 cm$^3$) | 10 mL (refractive index 1.41) | 20 | 100 | 70 |
| C. Ex. 1 | Eu:LiCaAlF$_6$ (11 cm$^2$/cm$^3$) | bulk body | — | — | 100 | 0 | 95 |
| C. Ex. 2 | Eu:LiCaAlF$_6$ (450 cm$^2$/cm$^3$) | 12.5 g (4.17 cm$^3$) | 7.5 g (2.50 cm$^3$) | 10 mL (refractive index 1.62) | 25 | 100 | 26 |
| C. Ex. 3 | Eu:LiCaAlF$_6$ (3300 cm$^2$/cm$^3$) | 12.5 g (4.17 cm$^3$) | 7.5 g (2.50 cm$^3$) | 10 mL (refractive index 1.41) | 25 | 60 | 64 |

Ex. Example
C. Ex. Comparative Example

| | neutron detector counted value of signals exceeding threshold value (Counts/sec) | |
|---|---|---|
| | neutron | γ-ray |
| Example 1 | 28 | 0.043 |
| Example 2 | 33 | 0.18 |
| Example 3 | 36 | 0.89 |
| Example 4 | 36 | 0.89 |
| Example 5 | 36 | 0.89 |
| Comparative Example 1 | 29 | 17 |
| Comparative Example 2 | 29 | 37 |
| | 15 | 1.0 |
| Comparative Example 3 | 27 | 0.14 |

An Eu:LiSrAlF$_6$ crystal bulk body of indefinite shape of about 2 cm cube was first prepared, ground with a hammer mill and classified by dry classification. The obtained particles were let pass through a 200 μm upper sieve and a fraction remaining on a 100 μm lower sieve was collected to obtain amorphous inorganic phosphor particles. The specific surface area of the inorganic phosphor particles based on mass measured with a BET specific surface meter was 0.013 m$^2$/g, and the specific surface area based on volume was therefore 450 cm$^2$/cm$^3$.

[Filler]

The LiSrAlF$_6$ crystal used as the filler in this example had a density of 3.5 g/cm$^3$, a lithium mass fraction of 2.9 mass %, a lithium 6 isotope ratio of 7.6% and a neutron capture isotope content of 0.67 atom/nm$^3$.

Particles obtained by grinding a LiSrAlF$_6$ crystal bulk body and passing the obtained particles through a 100 μm sieve like the above inorganic phosphor were used as a filler.

[Resin]

The silicone resin used as the resin in this example is the KER-7030 of Shin-Etsu Chemical K.K. which is the same as that used in Example 1. This consists of two liquids which are liquid A and liquid B and can be used by mixing together equal amounts of these two liquids to prepare a resin precursor and curing the resin precursor by heating. The cured resin is a transparent resin which has an internal transmittance of 95%/cm at 380 nm which is the emission wavelength of the above inorganic phosphor Eu:LiSrAlF$_6$ crystal.

[Refractive Index]

The refractive indices at room temperature and a wavelength of 380 nm of the above materials used in this example were measured in the same manner as in Example 1. The results are given below.

| | |
|---|---|
| Eu:LiSrAlF$_6$ crystal | 1.41 |
| LiSrAlF$_6$ crystal | 1.41 |
| Resin | 1.41 |

Therefore, the ratio of the refractive index of the resin to the refractive index of the inorganic phosphor and the ratio of the refractive index of the transparent resin to the refractive index of the filler at 380 nm were 1.00.

[Production and Evaluation of Neutron Scintillator]

A neutron scintillator and a neutron detector were manufactured and evaluated in the same manner as in Example 1 except that 11.7 g (3.33 cm$^3$) of inorganic phosphor particles composed of the above Eu:LiSrAlF$_6$ crystal as the inorganic phosphor and 11.7 g (3.33 cm$^3$) of filler particles composed of the above LiSrAlF$_6$ crystal as the filler were used.

The volume fraction of the inorganic phosphor and the content of the filler in the obtained neutron scintillator can be calculated from the charge volumes of the above inorganic phosphor particles, filler particles and silicone resin as follows.

| | |
|---|---|
| Volume fraction of inorganic phosphor | 20 vol % |
| Content of filler | 100 vol % based on volume of inorganic phosphor |

Figure 10:
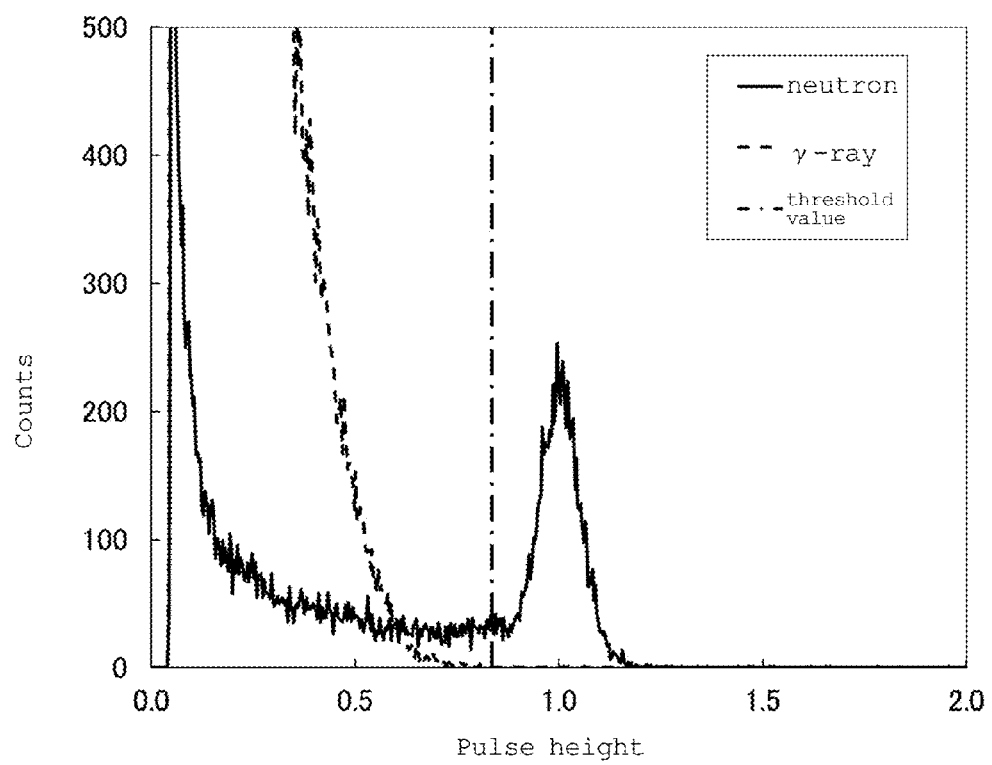
FIG. 10 shows pulse height distribution spectra obtained in Example 6.

The evaluation results are shown in Table 2, and neutron and γ-ray pulse height distribution spectra are shown in FIG. 10. As understood from Table 2 and FIG. 10, the neutron detector of this example is excellent in neutron detection efficiency and has a very small disturbing error in neutron counted value caused by a γ-ray.

Comparative Example 4

A neutron detector was manufactured and evaluated in the same manner as in Comparative Example 1 except that a rectangular parallelepiped Eu:LiSrAlF$_6$ single crystal measuring 1 cm×1 cm×0.3 cm and having a specific surface area of 11 cm$^2$/cm$^3$ was used as a neutron scintillator. The Eu:LiSrAlF$_6$ single crystal used herein was obtained by cutting the same 0.04 mol %-Eu:LiSrAlF$_6$ crystal as that used in Example 6 to the above size and mirror-finishing all of its surfaces. For the measurement of internal transmittance, a 1 cm×1 cm×1 cm cubic Eu:LiSrAlF$_6$ single crystal was prepared in the same manner as described above and used.

Figure 11:
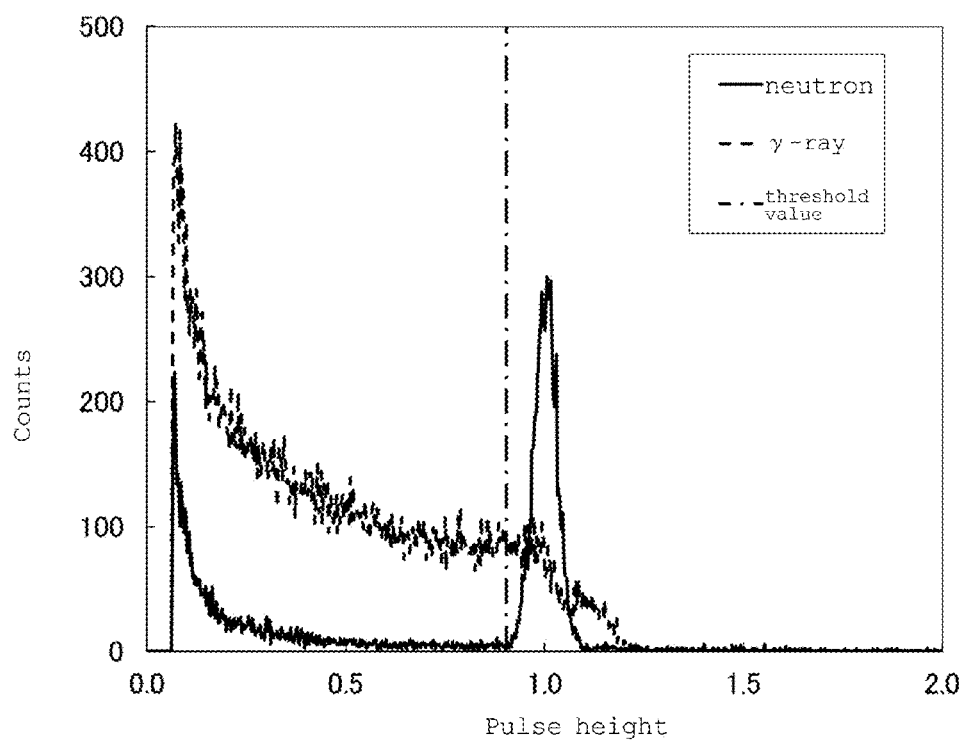
FIG. 11 shows pulse height distribution spectra obtained in Comparative Example 4.

The evaluation results are shown in Table 2, and neutron and γ-ray pulse height distribution spectra are shown in FIG. 11. It is understood from FIG. 11 that, although a clear neutron peak can be confirmed, the pulse height of an electric signal produced by a γ-ray partially overlaps with the neutral peak, thereby making it difficult to discriminate between a neutron and a γ-ray. It is seen from Table 2 that the counting rate of a γ-ray is 20 counts/sec in the presence of a large γ-ray dose, whereby a disturbing error caused by a γ-ray in neutron counted value becomes a significant problem.

Example 7

In this example, a neutron scintillator and a neutron detector were manufactured by using inorganic phosphor particles composed of Li$_2$O—MgO—Al$_2$O$_3$—SiO$_2$—Ce$_2$O$_3$-based glass (GS-20 of Saint-Gobain SA) as the inorganic phosphor and silicone resin having a refractive index at room temperature and 395 nm of 1.60 as the resin.

[Inorganic Phosphor]

The glass used as the inorganic phosphor in this example contained only lithium 6 as a neutron capture isotope and had a density of 2.5 g/cm$^3$, a lithium 6 isotope ratio of 95%, a neutron capture isotope content of 16 atoms/nm$^3$ and a wavelength of emission caused by σ irradiation of 395 nm.

The above values are the nominal values of Saint-Gobain SA which is the manufacturer of the glass.

A glass bulk body of indefinite shape of about 2 cm cube was first prepared, ground with a hammer mill and classified by dry classification. The obtained particles were let pass through a 200 μm upper sieve and a fraction remaining on a 100 μm lower sieve was collected to obtain indefinite inorganic phosphor particles. The specific surface area of the inorganic phosphor particles based on mass measured with a BET specific surface meter was 0.018 m$^2$/g, and the specific surface area based on volume was therefore 450 cm$^2$/cm$^3$.

[Resin]

The silicone resin used as the resin in this example consists of two liquids and can be used by mixing together the two liquids to prepare a resin precursor and curing the resin precursor by heating. The cured resin is a transparent resin having an internal transmittance of 93%/cm at 395 nm which is the emission wavelength of the above inorganic phosphor.

[Refractive Index]

The refractive indices at room temperature and a wavelength of 395 nm of the above materials used in this example were measured in the same manner as in Example 1. The results are given below.

| | |
|---|---|
| Inorganic phosphor | 1.55 |
| Resin | 1.60 |

Therefore, the ratio of the refractive index of the resin to the refractive index of the inorganic phosphor at 395 nm was 1.03.

[Production and Evaluation of Neutron Scintillator]

15.4 g (6.16 cm$^3$) of inorganic phosphor particles composed of the above glass and 10.0 mL of a resin precursor of the above silicone resin which was a mixture of two liquids were injected into a mixing vessel, the contents of the vessel were mixed well with a stirring rod, and the resulting mixture was defoamed by using a vacuum defoaming device to obtain a resin composition. A neutron scintillator and a neutron detector were manufactured and evaluated in the same manner as in Example 1 except that this resin composition was used.

The volume fraction of the inorganic phosphor in the obtained neutron scintillator can be calculated from the charge volumes of the above inorganic phosphor particles and the silicone resin as follows.

| | |
|---|---|
| Volume fraction of inorganic phosphor | 38 vol % |

Figure 12:
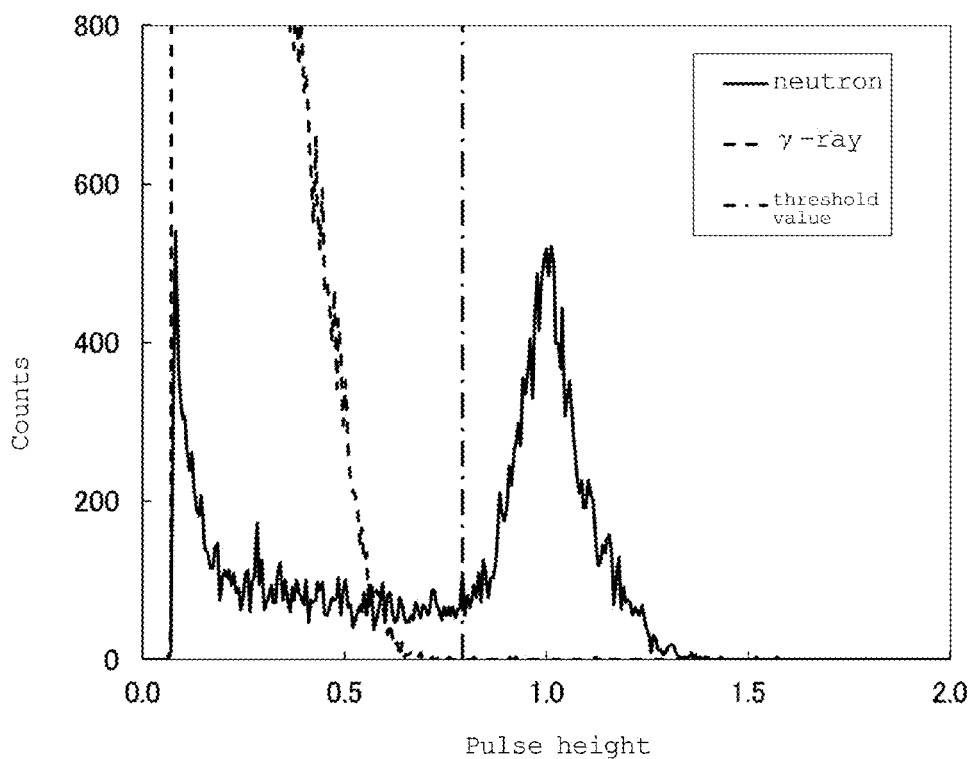
FIG. 12 shows pulse height distribution spectra obtained in Example 7.

The evaluation results are shown in Table 2, and neutron and γ-ray pulse height distribution spectra are shown in FIG. 12. It is understood from Table 2 and FIG. 12 that the neutron detector of this example is excellent in neutron detection efficiency and has a very small disturbing error caused by a γ-ray in neutron counted value.

Comparative Example 5

A neutron detector was manufactured and evaluated in the same manner as in Comparative Example 1 except that rectangular parallelepiped $Li_2O$—$MgO$—$Al_2O_3$—$SiO_2$—$Ce_2O_3$-based glass measuring 1 cm×1 cm×0.3 cm and having a specific surface area of 11 cm$^2$/cm$^3$ was used as a neutron scintillator. The glass used herein was obtained by cutting the same glass as that of Example 7 to the above size and mirror-finishing all of its surfaces. For the measurement of internal transmittance, cubic glass measuring 1 cm×1 cm×1 cm was prepared in the same manner as above and used.

Figure 13:
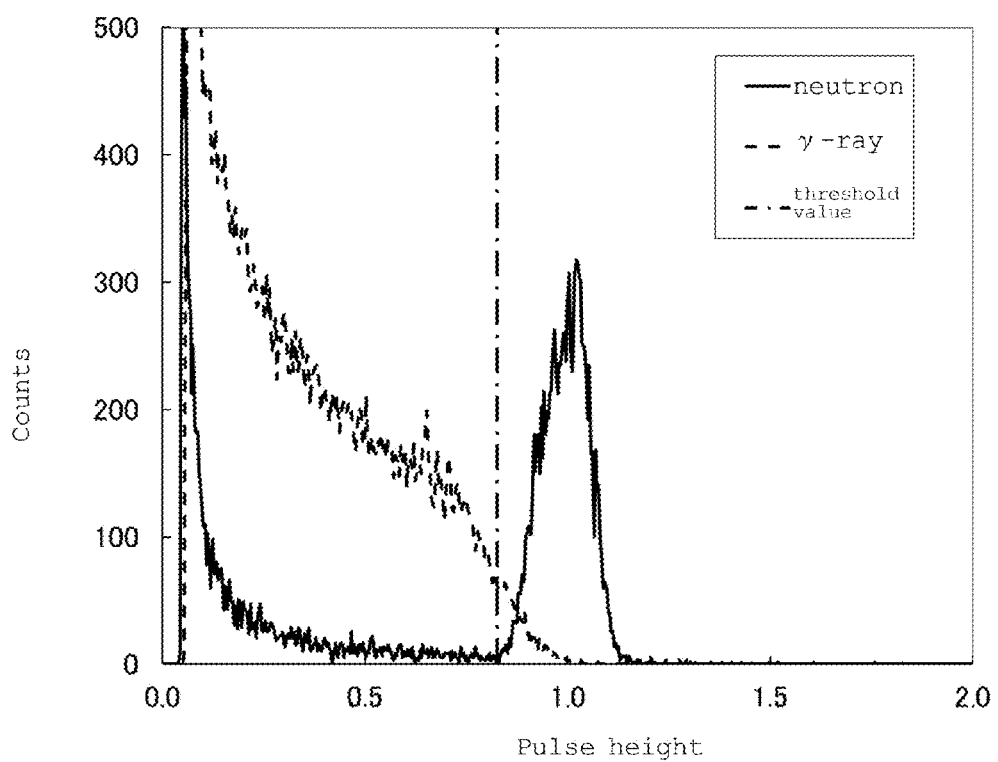
FIG. 13 shows pulse height distribution spectra obtained in Comparative Example 5.

The evaluation results are shown in Table 2, and neutron and γ-ray pulse height distribution spectra are shown in FIG. 13. It is seen from FIG. 13 that, although a clear neutron peak can be confirmed, the pulse height of an electric signal produced by a γ-ray partially overlaps with the neutron peak, thereby making it difficult to discriminate between a neutron and a γ-ray. It is understood from Table 2 that the counting rate of a γ-ray is 3.6 counts/sec in the presence of a large γ-ray dose, whereby a disturbing error caused by a γ-ray in neutron counted value becomes a significant problem.

TABLE 2

| | Neutron scintillator | | | | | |
|---|---|---|---|---|---|---|
| | Type of inorganic phosphor (specific surface area) | amount of each component | | | volume fraction of inorganic phosphor (%) | content of filler (%) | internal transmittance (%/cm) |
| | | Inorganic phosphor | filler | resin | | | |
| Ex. 6 | Eu:LiSrAlF$_6$ (450 cm$^2$/cm$^3$) | 11.7 g (3.33 cm$^3$) | 11.7 g (3.337 cm$^3$) | 10 mL (refractive index 1.41) | 20 | 100 | 70 |
| C. Ex. 4 | Eu:LiSrAlF$_6$ (11 cm$^2$/cm$^3$) | bulk body | — | — | 100 | 0 | 96 |
| Ex. 7 | GS-20 (450 cm$^2$/cm$^3$) | 15.4 g (6.16 cm$^3$) | 0.00 g (0.00 cm$^3$) | 10 mL (refractive index 1.60) | 38 | 0 | 65 |
| C. Ex. 5 | GS-20 (11 cm$^2$/cm$^3$) | bulk body | — | — | 100 | 0 | 93 |

Ex. Example
C. Ex. Comparative Example
GS-20: trade name, manufactured by Saint-Gobain SA, $Li_2O$—$MgO$—$Al_2O_3$—$SiO_2$—$Ce_2O_3$-based glass.

| | neutron detector counted value of signals exceeding threshold value (Counts/sec) | |
|---|---|---|
| | neutron | γ-ray |
| Example 6 | 27 | 0.057 |
| Comparative Example 4 | 28 | 20 |
| Example 7 | 58 | 0.073 |
| Comparative Example 5 | 40 | 3.6 |

Example 8

In this example, a neutron scintillator comprising a neutron insensitive phosphor besides an inorganic phosphor, a filler and a resin, and a neutron detector comprising the same were manufactured and evaluated.

The neutron scintillator was produced in the same manner as in Example 1 except that 1 mL of a toluene solution containing 5 mass % of 2,5-diphenyloxazole was used in place of 1 mL of toluene in Example 1.

The volume fraction of the inorganic phosphor, the content of the filler, the internal transmittance based on 1 cm of the optical path length at the emission wavelength of the inorganic phosphor and the content of the neutron insensitive phosphor in this neutron scintillator are given below.

| | |
|---|---|
| Volume fraction of inorganic phosphor | 20 vol % |
| Content of filler | 100 vol % based on volume of inorganic phosphor |
| Internal transmittance | 68%/cm |
| Content of neutron insensitive phosphor | 0.4 part by mass based on 100 parts by mass of resin |

A neutron detector was manufactured in the same manner as in Example 1 except that this neutron scintillator was used. To observe the waveform of a signal output from a photomultiplier tube, an oscilloscope was directly connected to the photomultiplier tube in place of a signal readout circuit composed of a preamplifier, a shaping amplifier and a multiple pulse height analyzer.

Figure 14:
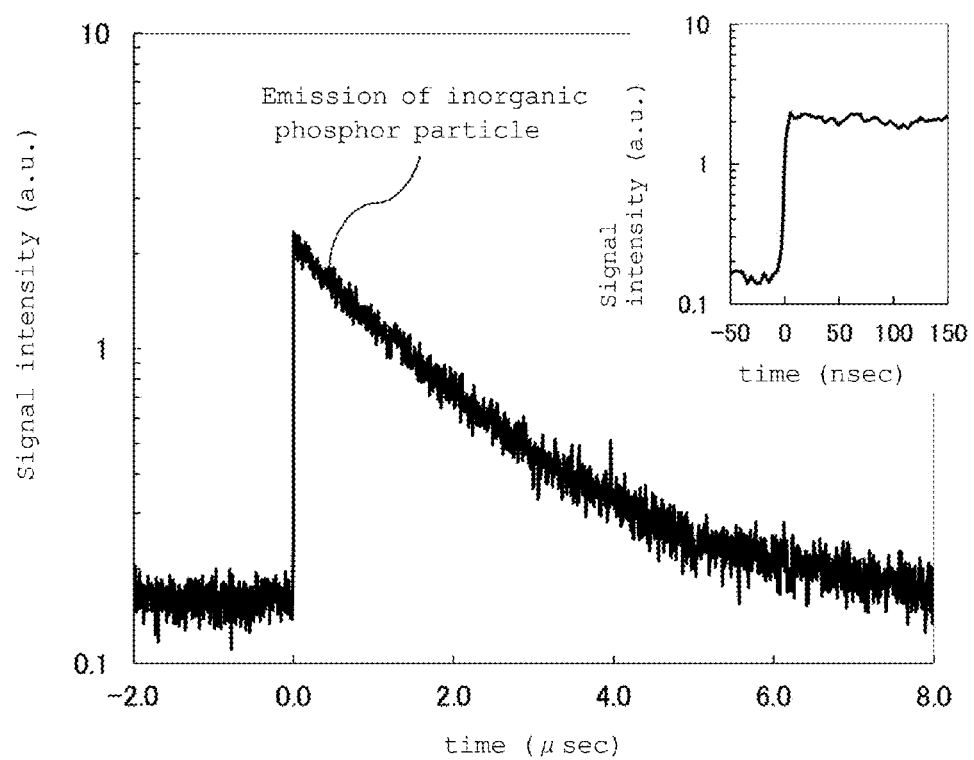
FIG. 14 is a diagram showing a signal waveform when a neutron is applied to a neutron detector obtained in Example 8.
Figure 15:
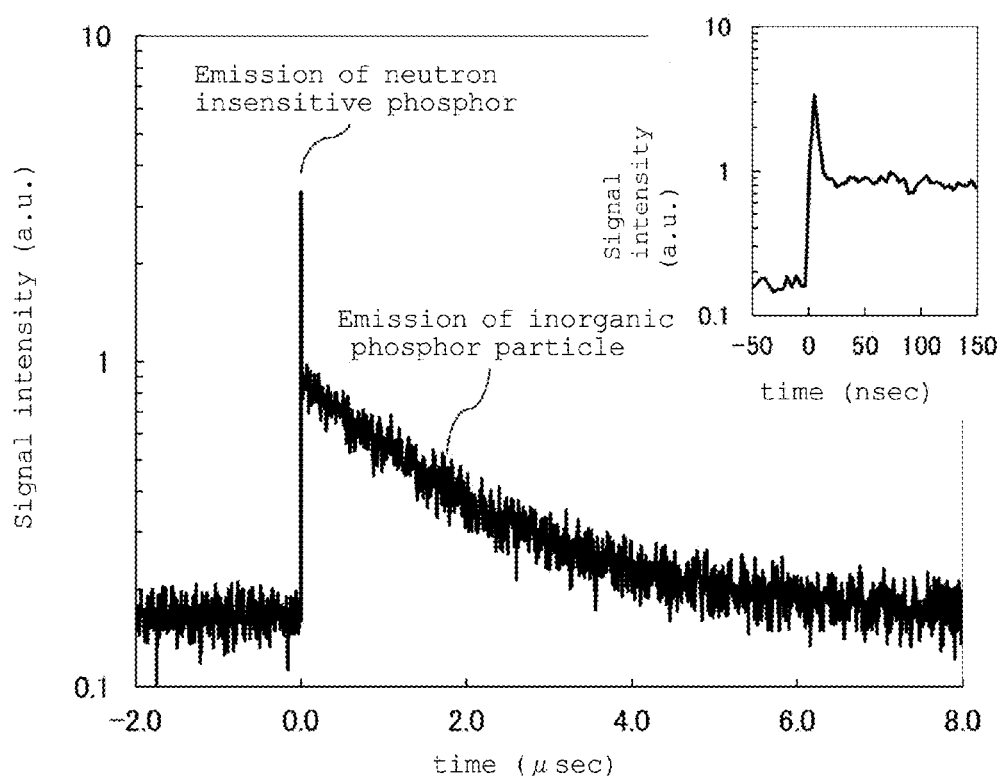
FIG. 15 is a diagram showing a signal waveform when a γ-ray is applied to the neutron detector obtained in Example 8.

A neutron and a γ-ray were applied to the neutron detector manufactured as described above in the same manner as in Example 1 to record the waveforms of signals output from the photomultiplier tube by means of the oscilloscope. The waveforms of signals obtained under neutron irradiation and under γ-irradiation are shown in FIG. 14 and FIG. 15, respectively. Insets in the upper right of these graphs are enlarged views at a time around 0.

It is understood from FIG. 14 that only long-life fluorescence from the inorganic phosphor particles is observed when a neutron is incident and from FIG. 15 that short-life fluorescence from the neutron insensitive phosphor is observed in addition to long-life fluorescence from the inorganic phosphor particles when a γ-ray is incident. Therefore, a neutron detector having excellent n/γ discrimination ability can be obtained by attaching the above-described waveform analyzing mechanism to the neutron detector of this example.

Example 9

Production of Neutron Scintillator

A plate-like neutron scintillator measuring 5 cm×5 cm×0.3 cm was obtained in the same manner as in Example 1 except that a polytetrafluoroethylene mold having a rectangular parallelepiped cavity was used in [production of neutron scintillator] of Example 1.

[Manufacture of Neutron Detector]

A neutron detector was manufactured by using the plate-like neutron scintillator which was manufactured as described above and a position sensitive photodetector.

One of the square bottom surface of the neutron scintillator was used as a light emission surface, and a polytetrafluoroethylene tape was wound round surfaces other than the light emission surface to form a light reflection film. A position sensitive photomultiplier tube (XP85012 of PHOTONIS) was prepared as a photodetector, and the light detection surface of the photomultiplier tube and the light emission surface of the above neutron scintillator were optically bonded together by using optical grease. The position sensitive photomultiplier tube used herein is a 64-channel multi-anode photomultiplier tube having anodes which are arranged in an 8×8 channel pattern.

After a multi-anode photomultiplier tube head amplifier unit (80190 of CLEAR-PULSE) was connected to the position sensitive photomultiplier tube, the above neutron scintillator and the photomultiplier tube were covered with a light shielding black sheet. Further, after the above head amplifier unit and an interface device (80190 PCIF of CLEAR-PULSE) were interconnected by a signal line as a signal readout circuit, the interface device and a computer are interconnected to manufacture a neutron detector.

The neutron detector manufactured herein is operated by a control program running on a computer so that pulse heights output from the anodes of 64 channels can be acquired at predetermined time intervals.

[Evaluation of Neutron Detector]

(1) Setting Threshold Value

Cf-252 having a radioactivity of 2.4 MBq as a neutron source was placed at the center of 20 cm cubic high-density polyethylene, and the neutron detector was arranged such that the neutron scintillator was situated at a position 10 cm away from the high-density polyethylene. A neutron produced from the above Cf-252 was moderated by the high-density polyethylene and then irradiated to the neutron scintillator of the neutron detector. A high voltage of 2,200 V was applied to the photomultiplier tube from a power source connected to the photomultiplier tube.

The neutron detector was operated by the control program running on the computer to collect pulse heights output from the anodes of 64 channels so as to obtain the sum of the pulse heights from the anodes. When a pulse height distribution spectrum was formed by using the sum of the pulse heights, the similar pulse height distribution spectrum as that shown by the solid line in FIG. 2 was obtained, whereby a clear neutron peak could be confirmed. Dispersion (σ) was obtained by fitting this neutron peak with a normal distribution function to set the threshold value to a pulse height 3σ lower than the pulse height of the neutron peak.

(2) Neutron Radiographic Imaging

The neutron detector which was manufactured as described above and the cubic high-density polyethylene having a neutron source at the center were placed as described above to take a neutron radiographic image.

Figure 16:
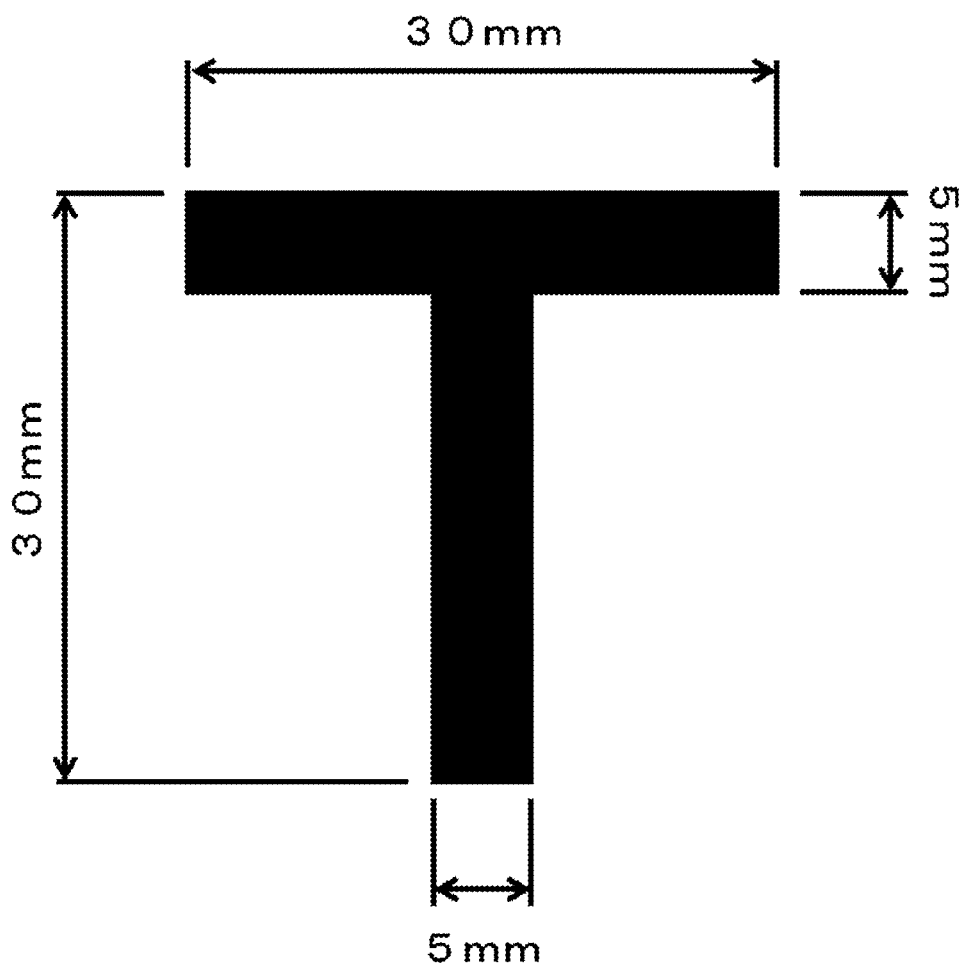
FIG. 16 is a diagram showing the shape of a cadmium plate used as an object to be imaged in Example 9.

As an object to be imaged, a T-shaped cadmium plate obtained by punching a cadmium plate having high neutron shielding ability into a T shape was used. The shape of the cadmium plate is shown in FIG. 16. The black T shape shows the shape of the cadmium plate. The thickness of the cadmium plate was 0.5 mm.

The above cadmium plate was placed in proximity to the light emission surface of the neutron scintillator to start taking a neutron radiographic image. To remove noise produced by a γ-ray, a neutron radiographic image was taken by using only a phenomenon that the sum of pulse heights from the anodes exceeded the above threshold value. The charge centroid was calculated for each event which exceeded the above threshold value to specify the incident position of a neutron.

The charge centroid is coordinates corresponding to the centroid position of electrons produced on the photoelectric surface of the position sensitive photomultiplier tube and obtained from the following expressions.

$$X_D = \Sigma(X_i \times I_i)/\Sigma(I_i)$$

$$Y_D = \Sigma(Y_i \times I_i)/\Sigma(I_i)$$

($X_D$ and $Y_D$ are the X coordinate and Y coordinate of the charge centroid, respectively, $X_i$ and $Y_i$ are the X coordinate and Y coordinate of an i-th anode, respectively, and $I_i$ is the pulse height of an i-th anode.)

The incident position of a neutron can be specified with much higher positional resolution than the pitch of the anodes of the position sensitive photomultiplier tube by carrying out the calculation of this charge centroid.

Figure 17:
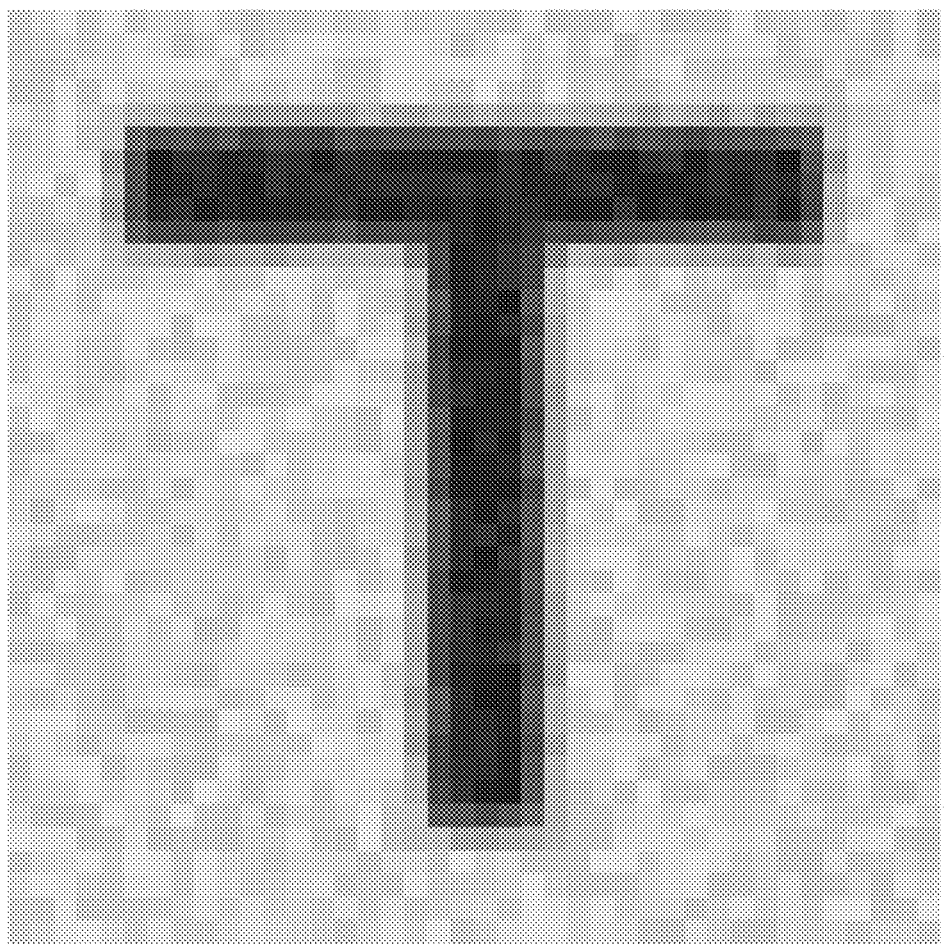
FIG. 17 shows a neutron radiographic image obtained in Example 9.

A 50×50 pixel neutron radiographic image was depicted by using the incident position of a neutron obtained by calculating the charge centroid for each event which exceeded the above threshold value. Since the size of the light detection surface of the position sensitive photomultiplier tube used in this example was 5 cm×5 cm, the size of each pixel was 1 mm×1 mm. The obtained neutron radiographic image is shown in FIG. 17. This neutron radiographic image is an image shown by a 128-tone gray scale in which a position with the frequent incidence of a neutron is shown in white and a position with the little incidence of a neutron is shown in black. Since the image is distorted by light reflection on the side surface of the scintillator at the periphery of the scintillator, only a 40×40 pixel region at the center is shown in FIG. 17.

With reference to FIG. 17, clear contrast is seen inside and outside the region of the imaged T-shaped cadmium plate so that it is understood that the image is a neutron radiographic image which reflects the shape of the cadmium plate shown in FIG. 16 accurately and clearly. Therefore, it is understood that the neutron detector comprising the neutron scintillator of the present invention can also be advantageously used as a position sensitive neutron detector.

Effect of the Invention

According to the present invention, there are provided a neutron scintillator having high neutron detection efficiency and excellent n/γ discrimination ability and a neutron detector comprising the neutron scintillator.

Since the neutron detector and the neutron detection method provided by the present invention can discriminate between a neutron and a γ-ray even in a place having a large γ-ray dose which becomes background noise, only a neutron can be measured with high accuracy and high efficiency. Therefore, the neutron detector provided by the present invention can be advantageously used in various fields in which neutron measurement is required, for example, the security field such as cargo inspection for the discovery of illegal nuclear-related substances; the academic research field such as structural analysis by neutron diffraction; the nondestructive inspection field; the medical field such as boron-neutron capture therapy; and the resource exploration field making use of a neutron.

The invention claimed is:

1. A neutron scintillator composed of a resin composition comprising (A) an inorganic phosphor containing at least one neutron capture isotope selected from lithium 6 and boron 10 and (B) a resin, wherein
    the inorganic phosphor is a particle having a specific surface area of 50 to 3,000 $cm^2/cm^3$, and the internal transmittance based on 1 cm of optical path length of the resin composition is 30%/cm or more at the emission wavelength of the inorganic phosphor.

2. The neutron scintillator according to claim 1, wherein the neutron capture isotope contained in the inorganic phosphor (A) is only lithium 6 or only boron 10.

3. The neutron scintillator according to claim 2, wherein the content of the inorganic phosphor (A) in the resin composition is 10 to 50 vol %.

4. A neutron detector comprising the neutron scintillator of claim 2, a photodetector and discrimination means for discriminating between a signal produced by a neutron and a signal produced by a γ-ray.

5. The neutron Scintillator according to claim 2, wherein the resin composition further comprises a filler containing essentially no neutron capture isotope.

6. The neutron scintillator according to claim 1, wherein the content of the inorganic phosphor (A) in the resin composition is 10 to 50 vol %.

7. The neutron Scintillator according to claim 6, wherein the resin composition further comprises a filler containing essentially no neutron capture isotope.

8. The neutron scintillator according to claim 1, wherein the resin composition further comprises (C) a phosphor containing no neutron capture isotope.

9. The neutron scintillator according to claim 8, wherein the content of the phosphor (C) in the resin composition is 0.01 to 5 parts by mass based on 100 parts by mass of the resin (B).

10. The neutron scintillator according to claim 9, wherein the content of the inorganic phosphor (A) in the resin composition is 10 to 50 vol %.

11. A neutron detector comprising the neutron scintillator of claim 9, a photodetector and discrimination means for discriminating between a signal produced by a neutron and a signal produced by a γ-ray.

12. The neutron scintillator according to claim 8, wherein the content of the inorganic phosphor (A) in the resin composition is 10 to 50 vol %.

13. A neutron detector comprising the neutron scintillator of claim 8, a photodetector and discrimination means for discriminating between a signal produced by a neutron and a signal produced by a γ-ray.

14. A neutron detector comprising the neutron scintillator of claim 1, a photodetector and discrimination means for discriminating between a signal produced by a neutron and a signal produced by a γ-ray.

15. The neutron Scintillator according to claim 1, wherein the resin composition further comprises a filler containing essentially no neutron capture isotope.

* * * * *